US008231453B2

(12) United States Patent
Wolf et al.

(10) Patent No.: US 8,231,453 B2
(45) Date of Patent: Jul. 31, 2012

(54) GAMING SYSTEM, GAMING DEVICE AND METHOD FOR PROVIDING A PLAYER AN OPPORTUNITY TO WIN A DESIGNATED AWARD BASED ON ONE OR MORE ASPECTS OF THE PLAYER'S SKILL

(75) Inventors: Bryan D. Wolf, Reno, NV (US); Adam Singer, Las Vegas, NV (US); Alexander Popovich, Henderson, NV (US); Cameron A. Filipour, Las Vegas, NV (US)

(73) Assignee: IGT, Reno, NV (US)

( * ) Notice: Subject to any disclaimer, the term of this patent is extended or adjusted under 35 U.S.C. 154(b) by 528 days.

(21) Appl. No.: 12/547,141

(22) Filed: Aug. 25, 2009

(65) Prior Publication Data

US 2011/0053676 A1 Mar. 3, 2011

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/20; 463/21; 463/23; 463/27; 463/7

(58) Field of Classification Search ..................... 463/20
See application file for complete search history.

(56) References Cited

U.S. PATENT DOCUMENTS 1,489,191 A 4/1924 Chester
1,547,834 A 7/1925 Smookler
2,111,952 A 3/1938 Tratsch
3,845,957 A 11/1974 Lohr et al.
3,986,718 A 10/1976 Long et al.
4,225,140 A 9/1980 D'Andrade et al.
4,652,998 A 3/1987 Koza et al.
4,685,677 A * 8/1987 Demar et al. .................. 463/23
4,744,566 A 5/1988 Malavazos et al.
4,759,551 A 7/1988 Crompton
5,265,874 A 11/1993 Dickinson et al.
5,280,909 A 1/1994 Tracy
5,326,108 A 7/1994 Faith
5,344,144 A 9/1994 Canon
5,364,104 A 11/1994 Jones et al.
(Continued)

FOREIGN PATENT DOCUMENTS

WO WO/00/64545 11/2000
(Continued)

*Primary Examiner* — Dmitry Suhol
*Assistant Examiner* — Kevin Y Kim
(74) *Attorney, Agent, or Firm* — Neal, Gerber & Eisenberg LLP

(57) ABSTRACT

In various embodiments, the gaming system, gaming device, and method disclosed herein maintains a designated award which is associated with a variable score for a skill-based game. In one such embodiment, the gaming system enables a player to play a game, wherein the gaming system forms a score for the player. The player's formed score is based on zero, one or more inputs made by the player during the play of the skill-based game (i.e., which tends to measure one or more aspects of that player's skills). If the player's score does not reach the variable score associated with the designated award, the gaming system modifies the variable score associated with the designated award of that skill-based game. If the player's score reaches or exceeds the variable score associated with the designated award, the gaming system provides the player a designated quantity of opportunities to win the maintained designated award.

26 Claims, 14 Drawing Sheets

| | Event | High Score | Progressive Award |
|---|---|---|---|
| 302 | Determine Progressive Award and High Score | 100,000,000 points | $10,000.00 |
| 304 | After 100,000 skill-based games are played, the high score is decreased by 100,000* the decay rate of 100 points/game and a player's score of 92,000,000 exceeds the high score. The player is provided:<br>Opportunities = (92,000,000 - 90,000,000)/100<br>Opportunities = 20,000<br>20,000 opportunities with 1/1,000,000 odds results in a probability of winning the progressive award of 1.98%.<br>The player does not win the progressive award.<br>The high score is modified to 92,000,000. | 90,000,000 points | $10,500.00 |
| 306 | After 100,000 skill-based games are played, the high score is decreased by 100,000* the decay rate of 100 points/game and a player's score of 90,000,000 exceeds the high score. The player is provided:<br>Opportunities = (90,000,000 - 82,000,000)/100<br>Opportunities = 80,000<br>80,000 opportunities with 1/1,000,000 odds results in a probability of winning the progressive award of 7.69%.<br>The player wins the progressive award. The value of the progressive award is reset to $10,000.00 and the high score is modified to 90,000,000. | 82,000,000 points | $11,000.00 |

U.S. PATENT DOCUMENTS

| | | | |
|---|---|---|---|
| 5,377,973 | A | 1/1995 | Jones et al. |
| 5,417,435 | A | 5/1995 | Peretz |
| 5,460,384 | A | 10/1995 | Seidel et al. |
| 5,655,961 | A | 8/1997 | Acres et al. |
| 5,669,607 | A | 9/1997 | Silver et al. |
| 5,702,304 | A | 12/1997 | Acres et al. |
| 5,711,715 | A | 1/1998 | Ringo et al. |
| 5,741,183 | A | 4/1998 | Acres et al. |
| 5,743,523 | A | 4/1998 | Kelly et al. |
| 5,752,882 | A | 5/1998 | Acres et al. |
| 5,755,621 | A | 5/1998 | Marks et al. |
| 5,766,076 | A | 6/1998 | Pease et al. |
| 5,803,451 | A | 9/1998 | Kelly et al. |
| 5,816,913 | A | 10/1998 | Nakamura |
| 5,820,459 | A | 10/1998 | Acres et al. |
| 5,836,817 | A | 11/1998 | Acres et al. |
| 5,855,515 | A | 1/1999 | Pease et al. |
| 5,860,648 | A | 1/1999 | Petermeier et al. |
| 5,876,284 | A | 3/1999 | Acres et al. |
| 5,882,258 | A | 3/1999 | Kelly et al. |
| 5,885,158 | A | 3/1999 | Torango et al. |
| 5,890,963 | A | 4/1999 | Yen |
| 5,964,463 | A | 10/1999 | Moore, Jr. |
| 5,967,893 | A | 10/1999 | Lawrence et al. |
| 6,007,426 | A | 12/1999 | Kelly et al. |
| 6,050,895 | A | 4/2000 | Luciano, Jr. et al. |
| 6,110,043 | A | 8/2000 | Olsen |
| 6,117,009 | A | 9/2000 | Yoseloff |
| 6,120,376 | A | 9/2000 | Cherry |
| 6,144,375 | A | 11/2000 | Jain et al. |
| 6,146,273 | A | 11/2000 | Olsen |
| 6,149,519 | A | 11/2000 | Osaki et al. |
| 6,152,822 | A | 11/2000 | Herbert |
| 6,159,096 | A | 12/2000 | Yoseloff |
| 6,162,122 | A | 12/2000 | Acres et al. |
| 6,171,186 | B1 | 1/2001 | Kurosawa et al. |
| 6,179,711 | B1 | 1/2001 | Yoseloff |
| 6,179,713 | B1 | 1/2001 | James et al. |
| 6,182,086 | B1 | 1/2001 | Lomet et al. |
| 6,210,275 | B1 | 4/2001 | Olsen |
| 6,213,876 | B1 | 4/2001 | Moore, Jr. |
| 6,231,445 | B1 | 5/2001 | Acres |
| 6,238,288 | B1 | 5/2001 | Walker et al. |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,283,474 | B1 | 9/2001 | de Keller |
| 6,311,976 | B1 | 11/2001 | Yoseloff et al. |
| 6,312,333 | B1 | 11/2001 | Acres |
| 6,319,125 | B1 | 11/2001 | Acres |
| 6,331,143 | B1 | 12/2001 | Yoseloff |
| 6,364,768 | B1 | 4/2002 | Acres et al. |
| 6,371,852 | B1 | 4/2002 | Acres |
| 6,375,567 | B1 | 4/2002 | Acres |
| 6,375,569 | B1 | 4/2002 | Acres |
| 6,413,160 | B1 | 7/2002 | Vancura |
| 6,425,823 | B1 | 7/2002 | Byrne |
| 6,428,413 | B1 | 8/2002 | Carlson |
| 6,431,983 | B2 | 8/2002 | Acres |
| 6,435,511 | B1 | 8/2002 | Vancura et al. |
| 6,435,968 | B1 | 8/2002 | Torango |
| RE37,885 | E | 10/2002 | Acres et al. |
| 6,517,433 | B2 | 2/2003 | Loose et al. |
| 6,565,434 | B1 | 5/2003 | Acres |
| 6,569,016 | B1 | 5/2003 | Baerlocher |
| 6,572,473 | B1 | 6/2003 | Baerlocher |
| 6,579,173 | B1 | 6/2003 | Okuda |
| 6,592,460 | B2 | 7/2003 | Torango |
| 6,599,193 | B2 | 7/2003 | Baerlocher et al. |
| 6,602,135 | B1 | 8/2003 | Gerrard |
| 6,605,001 | B1 | 8/2003 | Tarantino |
| 6,607,441 | B1 | 8/2003 | Acres |
| 6,645,075 | B1 | 11/2003 | Gatto et al. |
| 6,656,047 | B1 | 12/2003 | Tarantino et al. |
| 6,666,765 | B2 | 12/2003 | Vancura |
| 6,666,766 | B2 | 12/2003 | Baerlocher et al. |
| 6,688,977 | B1 | 2/2004 | Baerlocher et al. |
| 6,702,671 | B2 | 3/2004 | Tarantino |
| 6,712,697 | B2 | 3/2004 | Acres |
| 6,746,016 | B2 | 6/2004 | Perrie et al. |
| 6,752,717 | B2 | 6/2004 | Vancura |
| 6,758,749 | B2 | 7/2004 | Krintzman |
| 6,761,632 | B2 | 7/2004 | Bansemer et al. |
| 6,763,273 | B2 | 7/2004 | Chudley et al. |
| 6,769,986 | B2 | 8/2004 | Vancur |
| 6,776,711 | B1 | 8/2004 | Baerlocher |
| 6,780,103 | B2 | 8/2004 | Bansemer et al. |
| 6,780,110 | B2 | 8/2004 | Baerlocher et al. |
| 6,793,578 | B2 | 9/2004 | Luccesi et al. |
| 6,796,902 | B2 | 9/2004 | Baerlocher et al. |
| 6,800,026 | B2 | 10/2004 | Cannon |
| 6,800,030 | B2 | 10/2004 | Acres |
| 6,811,482 | B2 | 11/2004 | Letovsky |
| 6,811,494 | B2 | 11/2004 | Tamura et al. |
| 6,832,958 | B2 | 12/2004 | Acres et al. |
| 6,852,027 | B2 | 2/2005 | Kaminkow et al. |
| 6,863,606 | B1 | 3/2005 | Berg et al. |
| 6,910,962 | B2 | 6/2005 | Marks et al. |
| 6,910,964 | B2 | 6/2005 | Acres |
| 6,942,568 | B2 | 9/2005 | Baerlocher |
| RE38,812 | E | 10/2005 | Acres et al. |
| 6,966,834 | B1 | 11/2005 | Johnson |
| 6,984,174 | B2 | 1/2006 | Cannon et al. |
| 6,988,732 | B2 | 1/2006 | Vancura |
| 7,001,278 | B2 | 2/2006 | Maya et al. |
| 7,011,581 | B2 | 3/2006 | Cole et al. |
| 7,056,215 | B1 | 6/2006 | Olive |
| 7,070,505 | B2 | 7/2006 | Vancura et al. |
| 7,073,793 | B2 | 7/2006 | Vancura |
| 7,077,744 | B2 | 7/2006 | Cannon |
| 7,081,050 | B2 | 7/2006 | Tarantino |
| 7,090,579 | B2 | 8/2006 | Tarantino |
| 7,094,149 | B2 | 8/2006 | Walker et al. |
| 7,108,603 | B2 | 9/2006 | Olive |
| 7,140,964 | B2 | 11/2006 | Walker et al. |
| 7,156,739 | B2 | 1/2007 | Walker et al. |
| 7,175,521 | B2 | 2/2007 | McClintic |
| 7,179,168 | B1 | 2/2007 | Tulley et al. |
| 7,201,657 | B2 | 4/2007 | Baerlocher et al. |
| 7,217,187 | B2 | 5/2007 | Vancura |
| 7,234,700 | B2 | 6/2007 | Vancura |
| 7,291,067 | B2 | 11/2007 | Tarantino |
| 7,297,059 | B2 | 11/2007 | Vancura et al. |
| 7,326,115 | B2 | 2/2008 | Baerlocher |
| 7,341,513 | B2 | 3/2008 | Cuddy et al. |
| 7,357,716 | B2 | 4/2008 | Marks et al. |
| 7,371,166 | B1 | 5/2008 | Webb et al. |
| 7,438,642 | B2 | 10/2008 | Walker et al. |
| 7,470,184 | B2 | 12/2008 | Baerlocher et al. |
| 7,481,709 | B2 | 1/2009 | Bussick et al. |
| 7,568,973 | B2 | 8/2009 | Iddings et al. |
| 7,572,182 | B2 | 8/2009 | Vancura |
| 7,578,740 | B2 | 8/2009 | Marks et al. |
| 7,597,621 | B2 | 10/2009 | Baerlocher |
| 7,607,976 | B2 | 10/2009 | Baerlocher et al. |
| 7,607,977 | B2 | 10/2009 | Baerlocher et al. |
| 7,621,809 | B2 | 11/2009 | Baerlocher et al. |
| 7,722,461 | B2 * | 5/2010 | Gatto et al. .................... 463/25 |
| 2001/0055990 | A1 | 12/2001 | Acres |
| 2002/0052229 | A1 | 5/2002 | Halliburton et al. |
| 2002/0055379 | A1 * | 5/2002 | Saidakovsky et al. ............ 463/9 |
| 2002/0132660 | A1 | 9/2002 | Taylor |
| 2002/0147040 | A1 | 10/2002 | Walker et al. |
| 2002/0169016 | A1 | 11/2002 | Tarantino |
| 2002/0193162 | A1 | 12/2002 | Walker et al. |
| 2003/0060279 | A1 | 3/2003 | Torango |
| 2003/0109301 | A1 | 6/2003 | Chudley et al. |
| 2003/0171140 | A1 | 9/2003 | Gatto et al. |
| 2003/0211881 | A1 | 11/2003 | Walker et al. |
| 2003/0222402 | A1 | 12/2003 | Olive |
| 2004/0002376 | A1 | 1/2004 | Swift et al. |
| 2004/0009811 | A1 | 1/2004 | Torango |
| 2004/0048644 | A1 | 3/2004 | Gerrard et al. |
| 2004/0063484 | A1 | 4/2004 | Dreaper et al. |
| 2004/0102238 | A1 | 5/2004 | Taylor |
| 2004/0116174 | A1 | 6/2004 | Baerlocher et al. |

| | | | | |
|---|---|---|---|---|
| 2004/0224742 | A1 | 11/2004 | Chudley et al. | |
| 2004/0224773 | A1 | 11/2004 | Sham | |
| 2005/0020352 | A1 | 1/2005 | Chilton et al. | |
| 2005/0032573 | A1 | 2/2005 | Acres et al. | |
| 2005/0101374 | A1 | 5/2005 | Acres | |
| 2005/0119047 | A1 | 6/2005 | Olive | |
| 2005/0143168 | A1 | 6/2005 | Torango | |
| 2005/0148377 | A1 | 7/2005 | Goldberg | |
| 2005/0176488 | A1 | 8/2005 | Olive | |
| 2005/0192087 | A1 | 9/2005 | Friedman et al. | |
| 2005/0209004 | A1 | 9/2005 | Torango | |
| 2006/0025195 | A1 | 2/2006 | Pennington et al. | |
| 2006/0025207 | A1 | 2/2006 | Walker et al. | |
| 2006/0030387 | A1 | 2/2006 | Jackson | |
| 2006/0030403 | A1 | 2/2006 | Lafky et al. | |
| 2006/0030960 | A1 | 2/2006 | Duhamel et al. | |
| 2006/0040732 | A1 | 2/2006 | Baerlocher et al. | |
| 2006/0040734 | A1 | 2/2006 | Baerlocher et al. | |
| 2006/0073874 | A1 | 4/2006 | Cregan et al. | |
| 2006/0281509 | A1 | 12/2006 | Arias-Vargas et al. | |
| 2007/0060271 | A1 | 3/2007 | Cregan et al. | |
| 2007/0060314 | A1 | 3/2007 | Baerlocher et al. | |
| 2007/0060321 | A1 | 3/2007 | Vazquez et al. | |
| 2007/0087818 | A1 | 4/2007 | Walker et al. | |
| 2007/0105619 | A1 | 5/2007 | Kniesteadt et al. | |
| 2007/0112706 | A1 | 5/2007 | Herbrich et al. | |
| 2007/0117618 | A1 | 5/2007 | Walker et al. | |
| 2007/0117621 | A1 | 5/2007 | Walker et al. | |
| 2007/0117641 | A1 | 5/2007 | Walker et al. | |
| 2007/0123347 | A1 | 5/2007 | Walker et al. | |
| 2007/0142108 | A1 | 6/2007 | Linard et al. | |
| 2007/0173318 | A1 | 7/2007 | Abbott | |
| 2007/0184887 | A1 | 8/2007 | Cannon | |
| 2007/0191088 | A1 | 8/2007 | Breckner et al. | |
| 2007/0191102 | A1 | 8/2007 | Coliz et al. | |
| 2007/0218982 | A1 | 9/2007 | Baerlocher | |
| 2007/0275777 | A1 | 11/2007 | Walker et al. | |
| 2007/0293293 | A1 | 12/2007 | Baerlocher et al. | |
| 2007/0298857 | A1 | 12/2007 | Schlottmann et al. | |
| 2007/0298874 | A1 | 12/2007 | Baerlocher et al. | |
| 2007/0298875 | A1* | 12/2007 | Baerlocher et al. | 463/27 |
| 2008/0015004 | A1 | 1/2008 | Gatto et al. | |
| 2008/0026824 | A1 | 1/2008 | Muir | |
| 2008/0039191 | A1 | 2/2008 | Cuddy | |
| 2008/0045302 | A1 | 2/2008 | Low | |
| 2008/0045344 | A1 | 2/2008 | Schlottmann et al. | |
| 2008/0064502 | A1 | 3/2008 | Schlottmann et al. | |
| 2008/0076517 | A1 | 3/2008 | Baerlocher et al. | |
| 2008/0076527 | A1 | 3/2008 | Low et al. | |
| 2008/0090651 | A1 | 4/2008 | Baerlocher | |
| 2008/0108404 | A1 | 5/2008 | Iddings et al. | |
| 2008/0108406 | A1 | 5/2008 | Oberberger | |
| 2008/0108410 | A1 | 5/2008 | Baerlocher | |
| 2008/0108423 | A1 | 5/2008 | Benbrahim et al. | |
| 2008/0108425 | A1 | 5/2008 | Oberberger | |
| 2008/0108430 | A1 | 5/2008 | Evans | |
| 2008/0108431 | A1 | 5/2008 | Cuddy et al. | |
| 2008/0113771 | A1 | 5/2008 | Baerlocher et al. | |
| 2008/0113779 | A1 | 5/2008 | Cregan | |
| 2008/0139274 | A1 | 6/2008 | Baerlocher | |
| 2008/0153564 | A1 | 6/2008 | Baerlocher et al. | |
| 2008/0234021 | A1 | 9/2008 | Palmer et al. | |
| 2008/0254893 | A1 | 10/2008 | Patel et al. | |
| 2008/0274790 | A1 | 11/2008 | Cannon | |
| 2008/0311980 | A1 | 12/2008 | Cannon | |
| 2009/0042645 | A1 | 2/2009 | Graham et al. | |
| 2009/0061991 | A1 | 3/2009 | Popovich et al. | |
| 2009/0061997 | A1 | 3/2009 | Popovich et al. | |
| 2009/0061998 | A1 | 3/2009 | Popovich et al. | |
| 2009/0061999 | A1 | 3/2009 | Popovich et al. | |
| 2009/0069073 | A1 | 3/2009 | Gerrard et al. | |
| 2009/0088238 | A1 | 4/2009 | Moody | |
| 2009/0088239 | A1 | 4/2009 | Iddings et al. | |
| 2009/0088244 | A1 | 4/2009 | Nicely et al. | |
| 2009/0104960 | A1 | 4/2009 | Kelly et al. | |
| 2009/0104987 | A1 | 4/2009 | Kelly et al. | |
| 2009/0111561 | A1 | 4/2009 | Dewaal et al. | |
| 2009/0117962 | A1 | 5/2009 | Filipour et al. | |
| 2009/0124362 | A1 | 5/2009 | Cuddy et al. | |
| 2009/0124363 | A1 | 5/2009 | Baerlocher et al. | |
| 2009/0124364 | A1 | 5/2009 | Cuddy et al. | |
| 2009/0170583 | A1 | 7/2009 | Moody | |
| 2009/0280904 | A1 | 11/2009 | Nicely et al. | |

FOREIGN PATENT DOCUMENTS

WO WO/2008/021448 2/2008

* cited by examiner

FIG. 4

| Points Range | Decay Rate |
|---|---|
| 90,000,000 to 100,000,000 | 100,000 points per play |
| 50,000,000 to 90,000,000 | 20,000 points per play |
| 10,000,000 to 50,000,000 | 1,000 points per play |
| 1,000,000 to 10,000,000 | 100 points per play |
| 0 to 1,000,000 | 50 points per play |

FIG. 6

| | Event | High Score | Progressive Award |
|---|---|---|---|
| 302 | Determine Progressive Award and High Score | 100,000,000 points | $10,000.00 |
| 304 | After 100,000 skill-based games are played, the high score is decreased by 100,000* the decay rate of 100 points/game and a player's score of 92,000,000 exceeds the high score. The player is provided:<br><br>Opportunities = (92,000,000 - 90,000,000)/100<br><br>Opportunities = 20,000<br><br>20,000 opportunities with 1/1,000,000 odds results in a probability of winning the progressive award of 1.98%.<br><br>The player does not win the progressive award.<br>The high score is modified to 92,000,000. | 90,000,000 points | $10,500.00 |
| 306 | After 100,000 skill-based games are played, the high score is decreased by 100,000* the decay rate of 100 points/game and a player's score of 90,000,000 exceeds the high score. The player is provided:<br><br>Opportunities = (90,000,000 - 82,000,000)/100<br><br>Opportunities = 80,000<br><br>80,000 opportunities with 1/1,000,000 odds results in a probability of winning the progressive award of 7.69%.<br><br>The player wins the progressive award. The value of the progressive award is reset to $10,000.00 and the high score is modified to 90,000,000. | 82,000,000 points | $11,000.00 |

GAMING SYSTEM, GAMING DEVICE AND METHOD FOR PROVIDING A PLAYER AN OPPORTUNITY TO WIN A DESIGNATED AWARD BASED ON ONE OR MORE ASPECTS OF THE PLAYER'S SKILL

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

Progressive awards associated with gaming devices are also known. In one form, a progressive award is an award amount which includes an initial amount funded by a casino and an additional amount funded through a portion of each wager made on the progressive gaming device. For example, 0.1% of each wager placed on the primary game of the gaming device associated with the progressive award may be allocated to the progressive award or progressive award fund or pool. The progressive award grows in value as more players play the gaming devices and more portions of these players' wagers are allocated to the progressive award. When a player obtains a winning symbol or symbol combination associated with the progressive award, the accumulated progressive award is provided to the player. After the progressive award is provided to the player, the amount of the next progressive award is reset to the initial value and a portion of each subsequent wager on a gaming device associated with a progressive award is allocated to the next progressive award.

Gaming devices involving games of skill are also known. Such games of skill are popular among certain players because these players feel a competitive edge while playing. That is, these players enjoy the feeling that a personal strength could lead to them winning one or more awards at the gaming device. However, because these gaming devices incorporate one or more elements of skill as a factor of determining whether to provide any awards to the player, these gaming devices often cause concern for gaming regulators and, in some cases, are not as popular with lower skilled players who feel severely disadvantaged. Moreover, in these gaming devices, the probability of each award or outcome being generated is based on one or more aspects of player skill (which varies from player to player) which cannot be exactly determined and thus the average expected payout is not guaranteed to be the same from player to player. Accordingly, the average expected payout for such gaming devices often cannot be exactly determined but only determined within a range.

One potential problem with providing players opportunities to win progressive awards based on one or more aspects of the player's skills, is that lower skilled players are at a disadvantage relative to higher skilled players. For example, in a gaming system wherein players are provided opportunities to win a progressive award by achieving a score which exceeds a current high score in a game, lower skilled players may not be skilled enough to achieve a score which exceeds a relatively high score. Thus, in this example, only higher skilled players have an opportunity to win the progressive award. In a game where a player must achieve a score which exceeds an extremely high score, lower skilled players may be discouraged from playing because they do not believe that they have enough skill to achieve a score which exceeds the high score.

Another potential problem with providing players one or more opportunities to win progressive awards based on one or more aspects of those players skills is that higher skilled players can receive several consecutive opportunities to win the progressive award. For example, a higher skilled player can intentionally achieve a score which exceeds a high score in a game by a very small margin such that, in a subsequent play of the game, it would not be difficult for them to achieve a score which exceeds the high score from their previous game.

There is a continuing need to provide new and different gaming devices and gaming systems which incorporate one or more aspects of skill in determining which progressive awards are provided to players.

There is also a continuing need to provide new and different gaming devices and gaming systems as well as new and different ways to provide awards to players including bonus awards.

SUMMARY

In various embodiments, the gaming system, gaming device, and method disclosed herein maintains a designated award which is associated with a variable score for a skill-based game. In one such embodiment, the gaming system enables a player to play a game, wherein the gaming system forms a score for the player. The player's formed score is based on zero, one or more quantifiable inputs made by the player during the play of the skill-based game (i.e., which tends to measure one or more aspects of that player's skills). If the player's score in the skill-based game does not reach the variable score associated with the designated award, the gaming system modifies the variable score associated with the designated award of that skill-based game. If the player's score reaches or exceeds the variable score associated with the designated award, the gaming system provides the player a designated quantity of opportunities to win the maintained designated award. In one such embodiment, the gaming system determines the designated quantity of opportunities to win the maintained designated award based on the difference between the score formed for the player and the variable score associated with the designated award. Such a configuration provides that, as the variable score associated with the designated award continues to change, lower skilled players playing the skill-based game have an increased chance of being provided such a designated award. Accordingly, the gaming system disclosed herein accounts for different players of different levels of skill (as quantified by zero, one or more inputs made by the player in the skill game) when providing players with opportunities to win skill-based designated awards.

In one embodiment, the gaming system enables a player to place a wager on a play of a skill-based game. In this embodiment, in addition to determining an award to provide to the player for each winning outcome which occurs in association with the play of the skill-based game, the gaming system also determines if any skill-based point modification events, such as a point accumulation event or a point reduction event, occur in association with the play of the skill-based game. In one such embodiment, the gaming system provides the player a quantity of zero, one, or more points for each skill-based point accumulation event which occurs in association with the play of the skill-based game. In this embodiment, the gaming system determines the player's score based on the player's quantity of accumulated points. In another embodiment, the gaming system reduces a quantity of zero, one or more points from a player for each point reduction event which occurs in association with the play of the skill-based game. In this embodiment, the gaming system determines the player's score based on the player's reduced quantity of points.

In one embodiment, in addition to accumulating points (or reducing points) to form the player's score, the gaming system also maintains one or more designated awards, described herein as progressive awards that are each associated with a variable score. In one embodiment, the variable score is a high score. In another embodiment, the variable score is a low score. In one embodiment, for each of the progressive awards, each time the player plays the skill-based game and the player's score does not reach the variable score associated the progressive award, the gaming system causes that variable score to change by a static amount (i.e., decrease a high score by a static amount or increase a low score by a static amount). In another embodiment, for each of the progressive awards, the gaming system causes the variable score to change at a constant rate until the gaming system forms a score for the player that reaches or exceeds the variable score associated with the progressive award. In another embodiment, for each of the progressive awards, the gaming system causes the variable score to change at two or more varying rates at different points in time. In other words, in this embodiment, the gaming system causes the variable score to change at a rate that is determined based on the current variable score.

In one embodiment, if the player's score in the skill-based game reaches or exceeds the variable score associated with the progressive award, the gaming system modifies the variable score associated with that progressive award to reflect the player's score and provides that player a designated quantity of opportunities to win that progressive award. In one such embodiment, the quantity of opportunities the gaming system provides to the player is based, at least in part, on the difference between the player's score for the game and the variable score associated with the progressive award (i.e., the margin by which the player's score exceeds the current high score or the margin by which the current low score is different than the player's currently reduced score). In this embodiment, it should be appreciated that the gaming system does not simply provide the progressive award to the player because the player's score reached the variable score associated with the progressive award. Rather, in this embodiment, the gaming system provides the player with one or more opportunities to win the progressive award.

In one embodiment, each opportunity to win the progressive award is a separate random determination of whether the player wins the progressive award. In this embodiment, each separate random determination is associated with a same probability of the player successfully winning the progressive award. That is, a first opportunity to win the progressive award is associated with a first probability of winning the progressive award, and at least a second opportunity to win the progressive award is associated with the first probability of winning the progressive award.

In one embodiment, if the player wins a progressive award, the gaming system provides the progressive award to the player and resets the value of that progressive award to a reset value. If the player does not win the progressive award, the gaming system does not provide the progressive award to the player and does not reset the value of the progressive award to a reset value.

Accordingly, by changing a variable score associated with a progressive award, the gaming system guarantees that a player's score will reach the variable score at some point (assuming that players continue playing) and that the gaming system will provide one or more opportunities to win the progressive award. It should be appreciated that higher skilled players will often achieve scores that reach the variable score associated with progressive award more often than lower skilled players, and thus higher skilled players can expect more opportunities to win the progressive awards.

Additional features and advantages are described herein, and will be apparent from the following Detailed Description and the figures.

BRIEF DESCRIPTION OF THE FIGURES

FIG. 4 is a table illustrating different decay rates being associated with different high score ranges.

FIG. 6 is a table illustrating a sequence of events including a high score decaying based on events which occur in association with the play of a game and a progressive award which increments until a player wins the progressive award.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
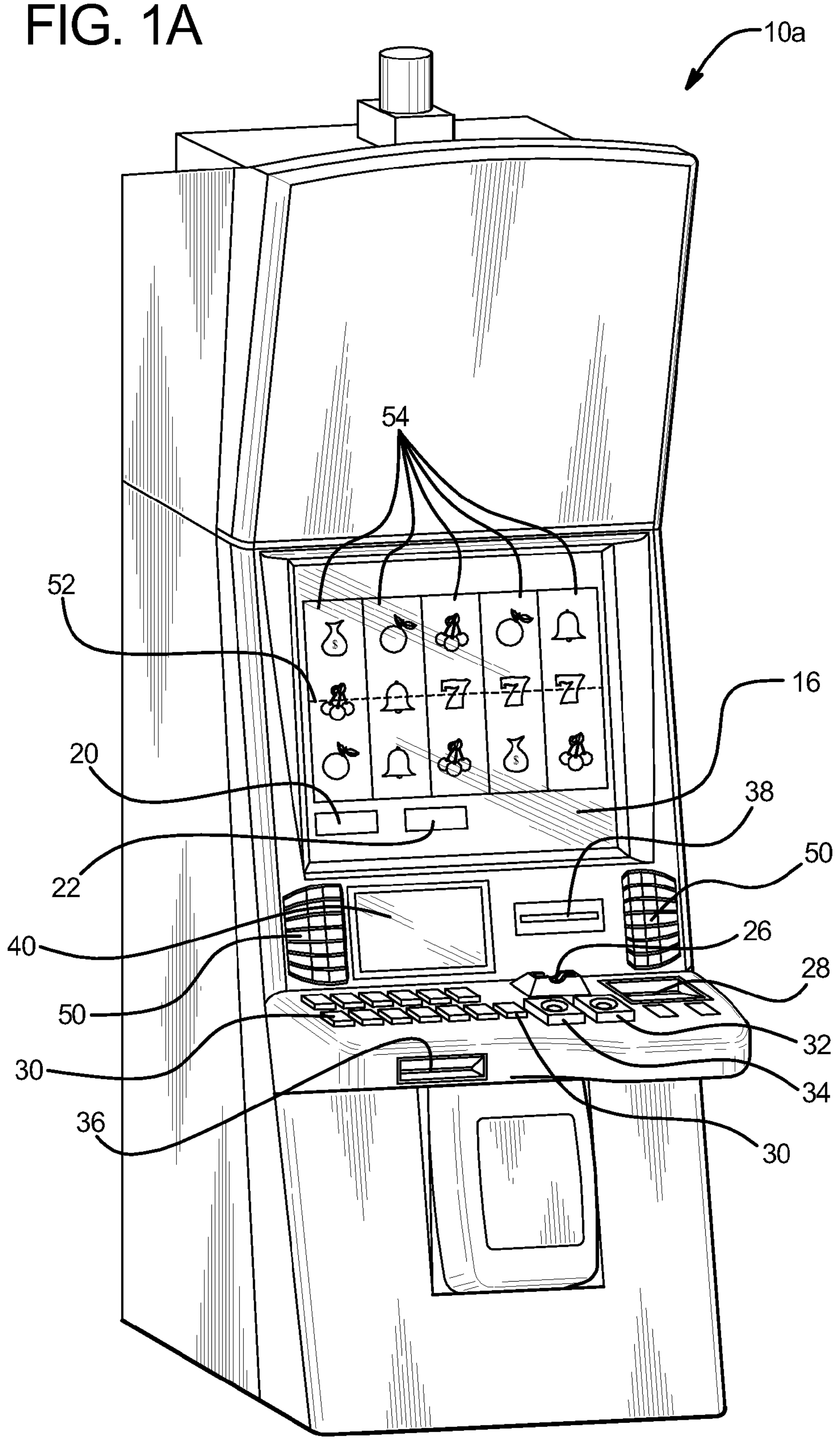
FIGS. 1A and 1B are front perspective views of alternative embodiments of gaming devices disclosed herein.
Figure 1B:
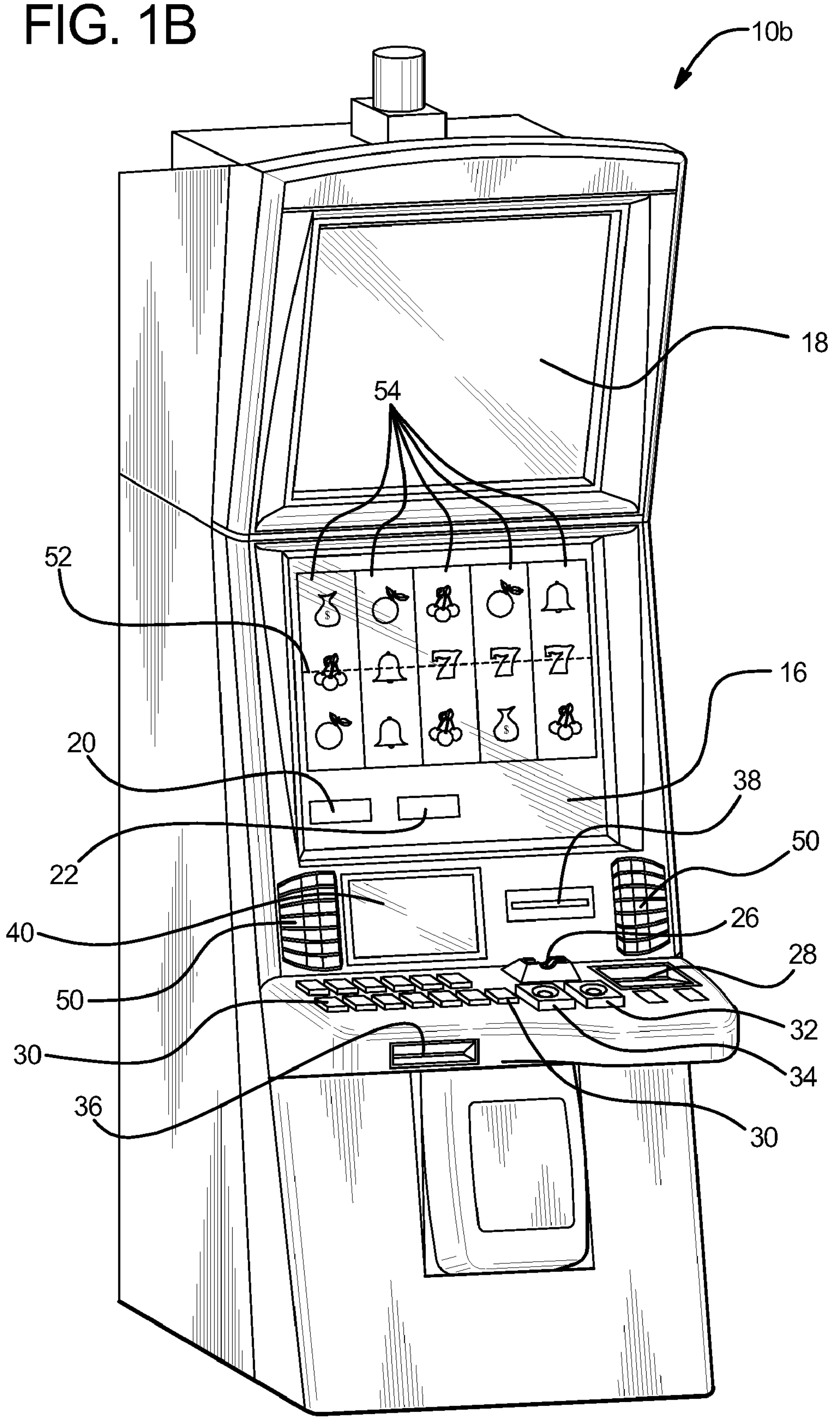

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
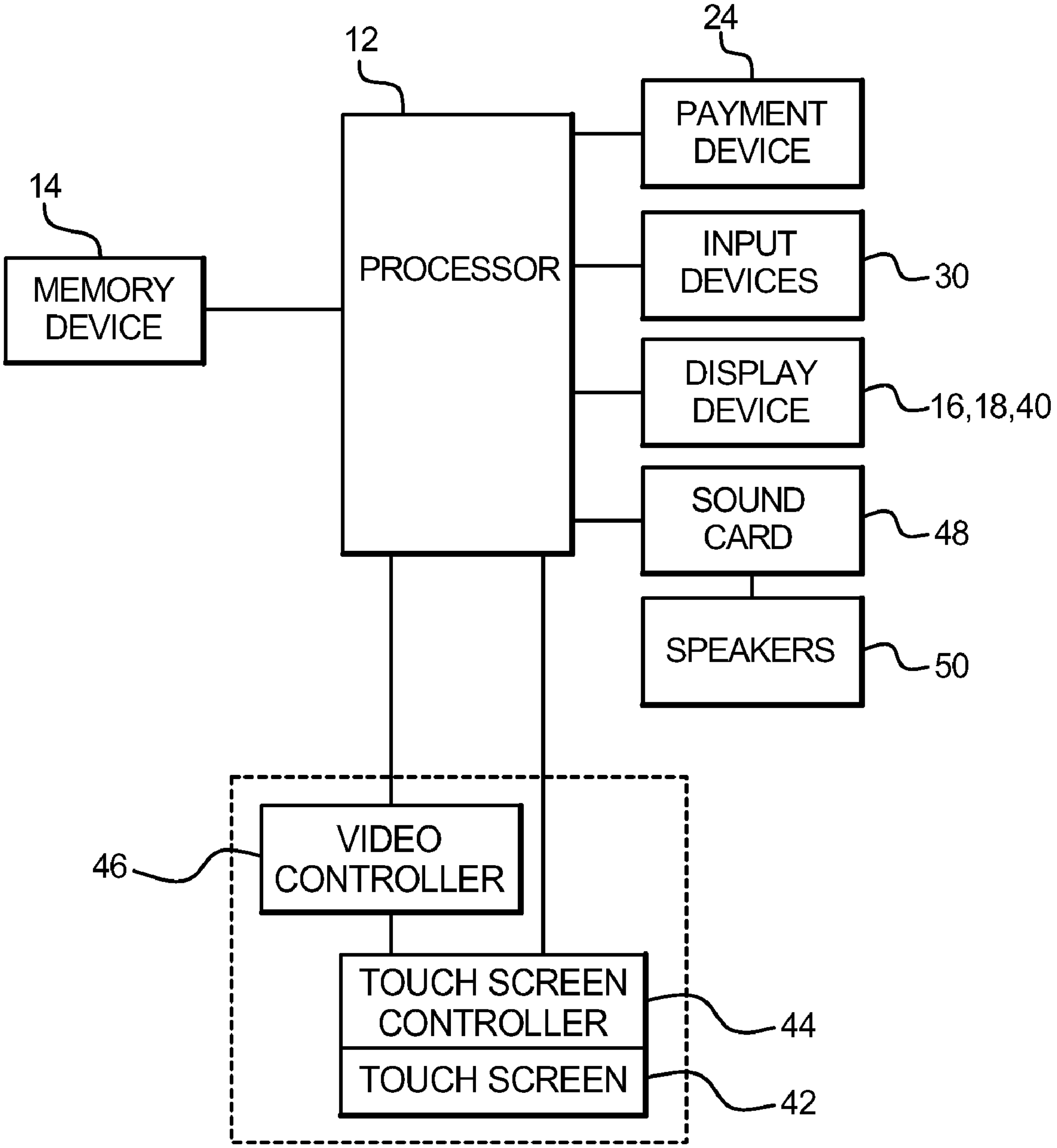
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

In one embodiment, the gaming machine includes at least one input device for player interaction. The input device may be any suitable input device used in an arcade-type gaming machine, such as a joystick, touchpad, mouse, rollerball, laser gun, pedals, wheel or keyboard to enable suitable player interaction. It should be appreciated that the gaming machines may alternatively or additionally include any suitable type of input device, including but not limited to, joysticks, keyboards, buttons, guns and rollerballs.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
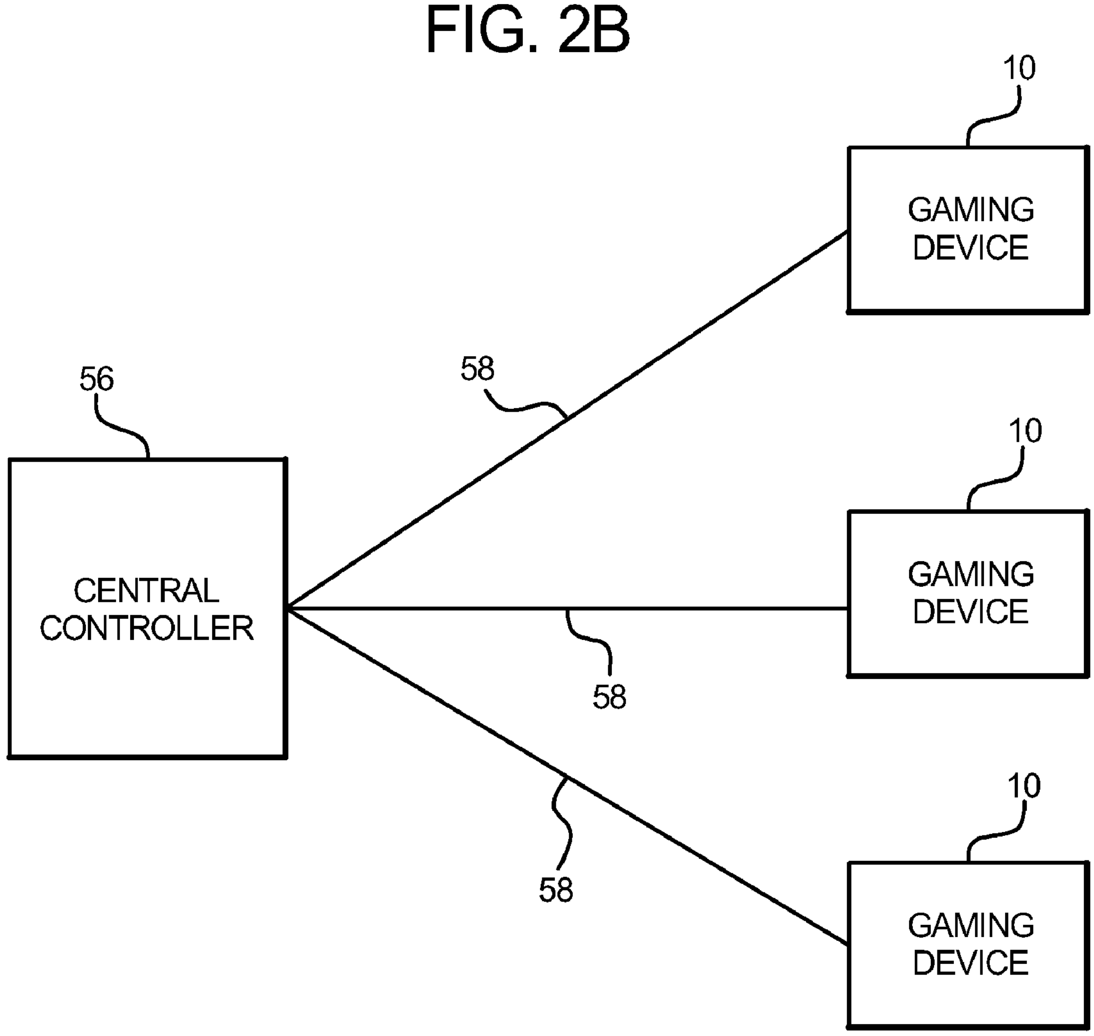
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Progressive Awards

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming device may trigger a progressive award win. In another embodiment, a central server (or the progressive gaming system host site computer) determines when a progressive award win is triggered. In another embodiment, an individual gaming device and a central controller (or progressive gaming system host site computer) work in conjunction with each other to determine when a progressive win is triggered, for example through an individual gaming device meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming devices in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one embodiment, as described in more detail below, the gaming system enables the player to initiate the play of a skill-based game by purchasing a contract to play the skill-based game for a designated amount of time (in exchange for a designated amount of money). In one embodiment, one or more of the progressive awards are funded via the purchasing of the contract to play the skill-based game. In one such embodiment, the gaming system allocates a portion of the purchase amount to each of one or more progressive awards. In one embodiment, for each progressive award, when the contract is purchased the gaming system causes the value of the progressive award to increment the entire amount allocated to that progressive award.

In another embodiment, for each progressive award, the gaming system causes the displayed value of the progressive award to increment at a constant rate for the duration of the designated amount of time of the purchased contract. In one such embodiment, for each progressive award, after the designated amount of time of the purchased contract has elapsed, the displayed value of the progressive award has incremented the entire amount allocated to that progressive award for that purchased contract. In this embodiment, the rate by which the gaming system causes the displayed value of the progressive award to increment is determined based on the amount allocated to that progressive award and the amount of time of the purchased contract.

In another embodiment, for each progressive award, the gaming system causes the displayed value of the progressive award to increment by different amounts at different points in time for the duration of the designated amount of time of the purchased contract. In one such embodiment, for each progressive award, the gaming system causes the displayed value of the progressive award to increment when a wagering event (discussed in more detail below) occurs. In this embodiment, when the wagering event occurs, the gaming system determines an amount to increment the displayed value of the progressive award based on the amount of time elapsed since a last wagering event occurred, the amount of time of the purchased contract and the amount allocated to that progressive award.

In one alternative embodiment, a minimum wager level is required for a gaming device to qualify to be selected to obtain one of the progressive awards. In one embodiment, this minimum wager level is the maximum wager level for the primary game in the gaming device. In another embodiment, no minimum wager level is required for a gaming device to qualify to be selected to obtain one of the progressive awards.

Score Based Progressive Awards

Figure 3:
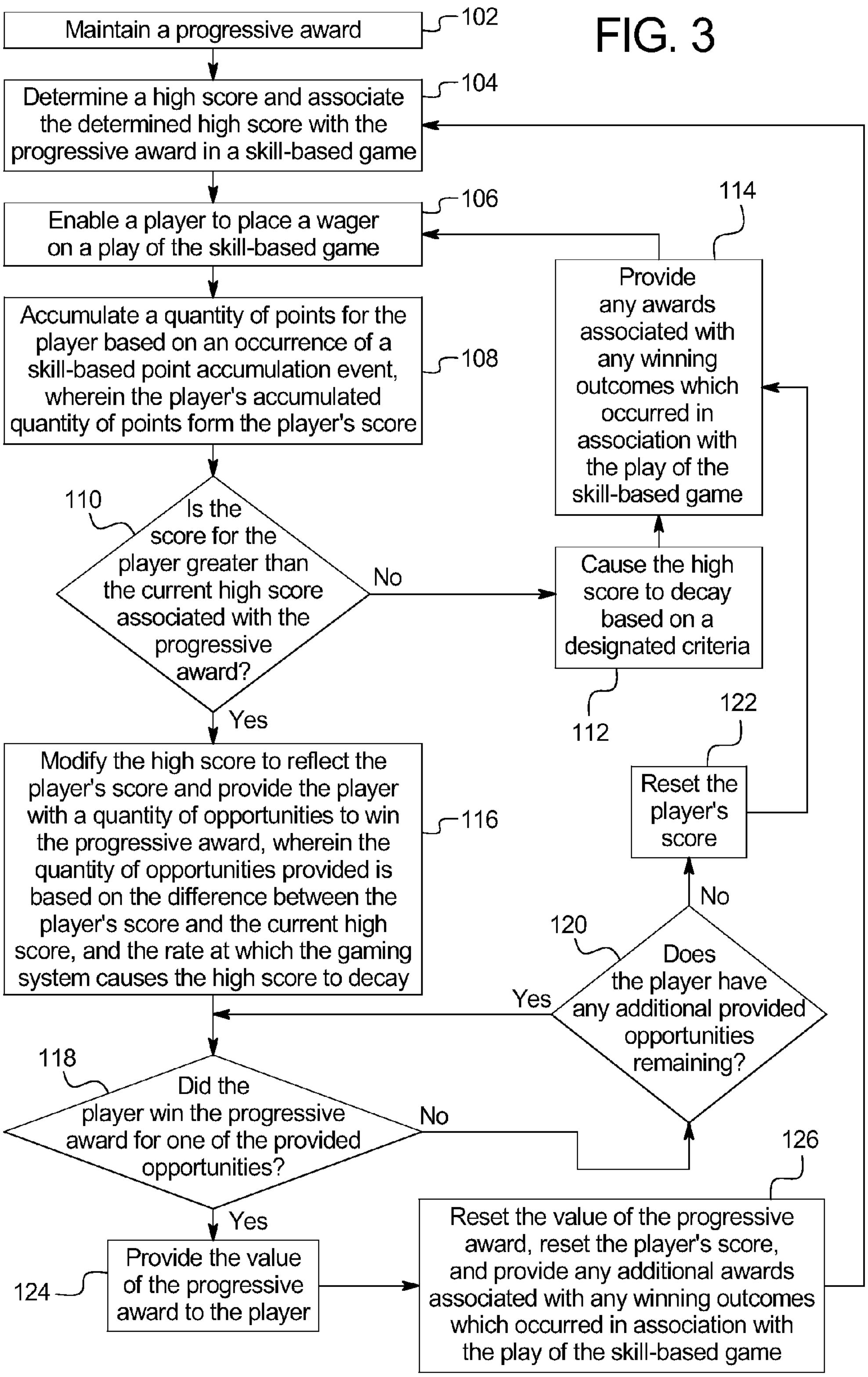
FIG. 3 is a flowchart of one embodiment of the gaming system disclosed herein and illustrating a primary game including a progressive award which is associated with a high score that is configured to decay based on a designated criteria if a player's score does not exceed the high score.

Referring now to FIG. 3, a flowchart of an example process for operating a gaming system or a gaming device disclosed herein is illustrated. In one embodiment, this process is embodied in one or more software programs stored in one or more memories and executed by one or more processors or controllers. Although this process is described with reference to the flowchart illustrated in FIG. 3, it should be appreciated that many other methods of performing the acts associated with this process may be used. For example, the order of certain of the blocks described may be changed, or certain of the blocks described may be optional.

In operation of this embodiment, the gaming system maintains a progressive award as indicated in block 102. In one embodiment, upon a suitable initializing event, the gaming system determines a high score and associates the determined high score with a progressive award in a skill-based game as indicated in block 104. For example, the gaming system determines a high score of 1,000,000 points and associates the determined high score with a progressive award having an initial value of $5,000.00.

After associating the high score with the progressive award, the gaming system enables a player to place a wager on a play of the skill-based game as indicated in block 106. In one embodiment, the gaming system accumulates a quantity of points for the player based on an occurrence of a skill-based point accumulation event. In this embodiment, the player's accumulated quantity of points form the player's score as indicated in block 108. That is, a skill-based point accumulation event occurs when the gaming system provides the player one or more points based on one or more aspects of the player's skill in the skill-based game. It should be appreciated that for purposes of this application, skill includes: (i) physical skill, such as, but not limited to: timing, aim, physical strength or any combination thereof which is quantifiable by zero, one or more inputs made by the player in association with the skill-based game; (ii) mental skill (i.e., knowledge, reasoning, and/or strategy) which is quantifiable by zero, one or more inputs made by the player in association with the skill-based game; and (iii) any other type of skill which is quantifiable by zero, one or more inputs made by the player in association with the skill-based game.

In one embodiment, the skill-based game is a conventional arcade game. In this embodiment, the gaming machine includes an arcade game which is physically similar in appearance and function to a conventional arcade game or arcade machine. For example, the gaming machine includes original arcade games such as Space Invaders, Asteroids, Pac Man and Dig Dug; casual arcade games such as Tetris and Bejeweled; first person shooter games such as Quake and Tomb Raider; multiplayer online role playing games such as Second Life; and simulation arcade games such as bowling and pinball.

In one embodiment, if a plurality of point accumulation events occur during play of the skill-based game, the gaming system accumulates one or more points for the player for each one of the skill-based point accumulation events. For example, the gaming system provides the player 50 points during the play of the game which when combined with the player' previously accumulated points, form a score of 23,650 for the player. In one embodiment, the gaming system accumulates different quantities of points for the player based on different skill-based point accumulation events which occur in association with the play of the skill-based game.

In one embodiment, after accumulating a quantity of points for the player, the gaming system determines if the formed score for the player (i.e., the player's score) is greater than the current high score associated with the progressive award as indicated in diamond 110. If the player's score does not exceed the current high score associated with the progressive award, the gaming system causes the high score to decay based on a designated criteria as indicated in block 112. For example, each time a player's score does not exceed the current high score associated with the progressive award, the gaming system causes the high score to decay 10 points. Thus, in the above discussed example, for the first play of the game, if the player's score is less than 1,000,000, the gaming system causes the high score of 1,000,000 to decay to 999,990.

In different embodiments, the designated criteria includes causing the high score to decay a predetermined amount, a randomly determined amount, an amount determined based on the player's status (such as determined through a player tracking system), an amount determined based on a random determination by the central controller, an amount determined based on a random determination at the gaming machine, an amount determined based on one or more side wagers placed, an amount determined based on the player's primary game wager, an amount determined based on time (such as the time of day), an amount determined based on an amount of coin-in accumulated in one or more pools, an amount determined based on a quantity of players playing gaming devices in the gaming system, an amount determined based on a player's skill as quantifiable by zero, one or more inputs made by the player in association with the skill-based game, an amount determined based on an amount of time elapsed since a player's score has exceeded the current high score or an amount determined based on any other suitable method or criteria.

In one embodiment, the gaming system causes the current high score to decay by the same designated amount each time the player's score does not exceed the current high score. In another embodiment, the gaming system causes the current high score to decay at varying rates at different points in time. That is, the high score does not decay by the same designated amount each time a player's score does not exceed the current high score. For example, at a first point in time, the gaming system causes the current high score to decay at a first rate, and at a second, different point in time, the gaming system causes the current high score to decay at a second, different rate.

In one embodiment, the rate at which the gaming system causes the high score to decay is based on a score range within which the high score falls at a given point in time. In this embodiment, different score ranges are associated with different rates of decay. That is, in this embodiment, a high score that falls within a first score range decays at a first rate, and a high score that falls within a second, different score range decays at a second, different rate. For example, referring now to FIG. 4, a first score range of 90,000,000 to 100,000,000 is associated with a decay rate of 100,000 points per play of the game, a second score range of 50,000,000 to 90,000,000 is associated with a decay rate of 20,000 points per play of the game, a third score rage of 10,000,000 to 50,000,000 is associated with a decay rate of 1,000 points per play of the game, a fourth score range of 1,000,000 to 10,000,000 is associated with a decay rate of 100 points per play of the game, and a fifth score range of 0 to 1,000,000 is associated with a decay rate of 50 points per play of the game. Thus, in this illustrated example, the gaming system causes extremely high scores to decay at much faster rates relative to lower high scores.

In addition to causing the high score to decay based on a designated criteria, the gaming system provides the player any awards associated with any winning outcomes which occur in association with the play of the skill-based game as indicated in block 114 of FIG. 3. In one embodiment, if the player's score is greater than the current high score associated with the progressive award, the gaming system modifies the high score such that the player's score is the current high score. The gaming system then provides the player with a quantity of opportunities to win the maintained progressive award. In one embodiment, the quantity of opportunities provided to the player is based on a difference between the player's score and the current high score, and the rate at which the gaming system causes the high score to decay as indicated in block 116. That is, in this embodiment, the player must accumulate enough points to form a score that is greater than the current high score to have an opportunity to win the progressive award.

For example, after a play of the game, the player's score is 992,224, which is greater than a current high score of 721,360 (which has decayed from 1,000,000). Thus, the gaming system determines to provide the player 27,086 opportunities to win the progressive award based on the margin by which the player's score exceeded the current high score and the rate by which the gaming system caused the high score to decay (i.e., (992,224−721,360)/10, rounded down to the nearest integer=27,086). In one embodiment, each opportunity is associated with a random determination having a probability of causing the player to win the progressive award. For example, each of the 27,086 provided opportunities is associated with a random determination having a 1/1,000,000 probability of causing the player to win the progressive award. In this example, the player has a 2.67% probability of winning the progressive award (i.e., $1-(1-1/1{,}000{,}000)^{27{,}086}=2.67\%$).

It should be appreciated that, by causing the high score to decay each time the player's score does not exceed the current high score, the gaming system provides players with an increased probability of beating (i.e., achieving a score which exceeds the current high score) the high score in subsequent plays of the game. That is, players do not have to score as many points to beat the current high score in subsequent plays of the game. In one embodiment, the gaming system accounts for this increase in the probability of exceeding the current high score in subsequent plays of the game by determining the quantity of opportunities to win the progressive award based, at least in part, on the rate by which the gaming system causes the high score to decay.

In one embodiment, the gaming system determines if the player wins the progressive award for one of the provided opportunities as indicated in diamond 118. If the player does not win the progressive award for that provided opportunity, the gaming system determines if the player has any additional provided opportunities remaining as indicated in diamond 120. If the player has at least one additional provided opportunity remaining, the gaming system again determines if the player wins the progressive award for at least that one additional provided opportunity. For example, after a first random determination, wherein the player does not win the progressive award, the gaming system determines that the player has at least one additional opportunity remaining. Thus, the gaming system performs a second random determination of whether the player wins the progressive award. If the player does not win the progressive award and does not have any additional provided opportunities remaining, the gaming system resets the player's score as indicated in block 122. For example, the player in the example discuss above is provided 27,086 opportunities to win the progressive award, however, the opportunities provided to the player to do not result in the player winning the progressive award, and thus the gaming system resets the player's score. In one embodiment, if the player's opportunities do not result in the player winning the progressive award, the gaming system provides the player one or more consolation awards for achieving a score that is greater than the current high score. After resetting the player's score, the gaming system provides the player any awards associated with any winning outcomes which occurred in association with the play of the skill-based game as indicated in block 114.

It should be appreciated that, in the above discussed example, although a player's score has exceeded the current high score, the provided opportunities did not cause the player to win the progressive award, and thus the gaming system did not provide the progressive award to the player. In other words, players are not simply provided the progressive award because their score exceeds the current high score. Thus, the high score continues to decay and the progressive award continues to increment until the gaming system determines to provide the progressive award to the player based on one or more provided opportunities.

For example, after a plurality of additional games are played, the gaming system in the example discussed above forms a score of 1,789,500 for the player which exceeds the current high score of 681,890 (which decayed from 992,220). Thus, the gaming system determines to provide the player 110,761 opportunities to win the progressive award based on the margin by which the player's score exceeded the current high score and the rate by which the gaming system caused the high score to decay (i.e., (1,789,500−681,890)/10=110,761). As discussed above, each provided opportunity is associated with a random determination having a probability of causing the player to win the progressive award. For example, each of the 110,761 provided opportunities are associated with a 1/1,000,000 probability of causing the player to win the progressive award. Thus, in this example, the player has a 10.48% probability of winning the progressive award (i.e., $1-(1-1/1,000,000)^{110,761}=10.48\%$).

In one embodiment, if the player wins the progressive award, the gaming system provides the value of the progressive award to the player as indicated in block 124. For example, one or more of the random determinations associated with the 110,761 opportunities provided to the player in the example discussed above causes the player to win the progressive award. Thus, in this example, the gaming system provides the player the progressive award which has a value of $5,588.97 (which has incremented from $5000.00). It should be appreciated that, in one embodiment, the gaming system performs a random determination for each of a plurality of provided opportunity, regardless of the outcome of each random determination. In one such embodiment, the player wins the progressive award based on more than one of the plurality of provided opportunities (i.e., a plurality of the random determinations cause the player to win the progressive award). In this embodiment, the progressive award is provided to the player a single time, regardless of the quantity of provided opportunities (i.e., random determinations) that cause the player to win the progressive award.

After providing the player the value of the progressive award, the gaming system resets the value of the progressive award to a reset value, resets the player's score, and provides the player any additional awards associated with any winning outcomes which occurred in association with the play of the skill-based game as indicated in block 126. For example, after providing the player the $5,588.97 progressive award, the gaming system resets the value of the progressive award to $5,000.00.

In one embodiment, as discussed above, each provided opportunity to win the progressive award is associated with a random determination of whether to provide the progressive award to the player. For example, if 5000 opportunities are provided to a player, the gaming system performs 5000 separate random determinations of whether the player wins the progressive award. In another embodiment, if the gaming system determines to provide a player with a first quantity of opportunities to win the progressive award, the gaming system performs a second, different quantity of random determinations to determine if the player wins the progressive award. In one such embodiment, the second quantity of random determinations is greater than the first quantity of opportunities to win the progressive award. In another such embodiment, the second quantity of random determination is less than the first quantity of opportunities to win the progressive award. In these embodiments, the gaming system determines a probability to associate with each random determination based on the probability of the player winning the progressive award. For example, if each of the 5000 provided opportunities in the example above are associated with a probability of 1/50,000 of the player winning the progressive award, the player has a 9.52% probability of winning the progressive award (i.e., $1-(1-1/50,000)^{5,000}=9.52\%$). Accordingly, based on a 9.52% probability of the player winning the progressive award, if the gaming system only performs 1000 random determinations, each random determination is associated with a probability of 1/10,000.4 of causing the player to win the progressive award (i.e., $1/10,000.4=1/[1-(1-0.0952)^{1/1000}]$). Thus, in the example above, while the overall probability of the player winning the progressive award remains 9.52%, because the gaming system performs less than 5000 random determinations, the probability associated with each random determination is different than the probability associated with each provided opportunity to win the progressive award.

Figure 5:
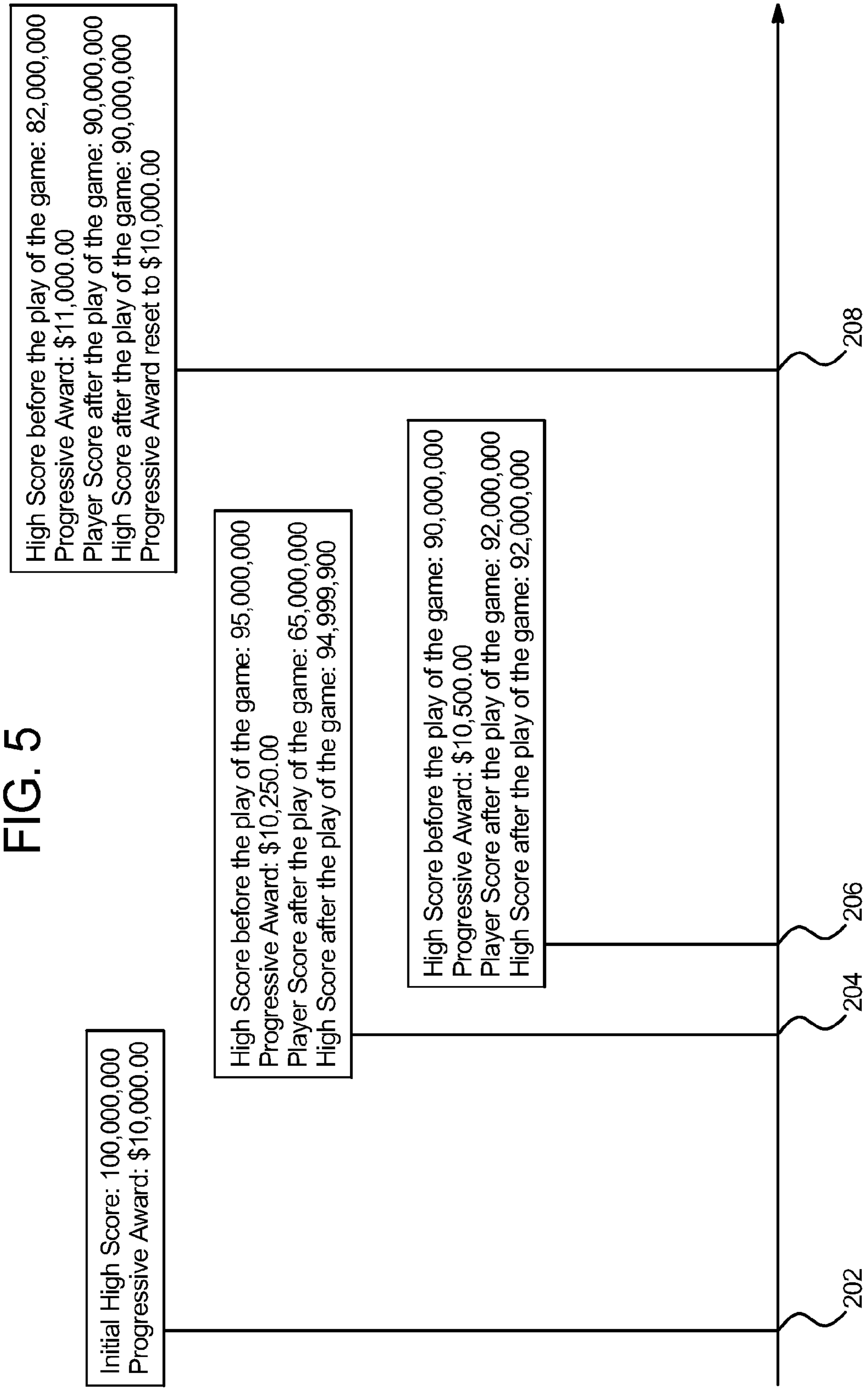
FIG. 5 is a timeline of the operation of one embodiment of the gaming system disclosed herein, illustrating a progressive award which is associated with a high score, wherein the high score decays until a player's score exceeds the high score and the progressive award increments until the player wins the progressive award.

Referring now to the point in time indicated by numeral 202 of FIG. 5 and row 302 of FIG. 6, the gaming system determines an initial high score of 100,000,000 and associates the determined high score with a progressive award having an initial value of $10,000.00. After each play of the game, wherein the player's score does not exceed the current high score, the gaming system causes the current high score to decay based on a designated criteria. At the point in time indicated by numeral 204 of FIG. 5, after a plurality of plays of the game, the high score has decayed to 95,000,000 (from 100,000,000) and the value of the progressive award has incremented to $10,250.00 (from $10,000.00). At this point in time, the gaming system forms a score of 65,000,000 for the player playing the game (which is less than the current high score of 95,000,000). Accordingly, because the player's score did not exceed the current high score, the gaming system causes the current high score to decay by 100 points from 95,000,000 to 94,999,900.

At the point in time indicated by numeral 206 and row 304 of FIG. 6, prior to the play of the game, the high score has decayed to 90,000,000 and the value of the progressive award has incremented to $10,500.00. After the play of the game, the gaming system forms a score of 92,000,000 for the player playing the game (which is greater than the current high score of 90,000,000). Thus, because the player's score exceeds the current high score, the gaming system modifies the current high score to 92,000,000 and determines to provide the player 20,000 opportunities to win the progressive award. In this example, each opportunity is associated with a 1/1,000,000 probability of causing the player to win the progressive award. Accordingly, the player has a 1.98% probability of winning the progressive award (i.e., $1-(1-{}^{1}/1,000,000)^{20,000}=1.98\%$).

In one embodiment, after providing a player one or more opportunities to win the progressive award, the gaming system displays a secondary or bonus game to the player wherein the player attempts to utilize their provided opportunities to win the progressive award. In one embodiment, the player participates in a pseudo-skill based secondary game, wherein the gaming system randomly determines whether to provide the progressive award to the player.

Figure 7A:
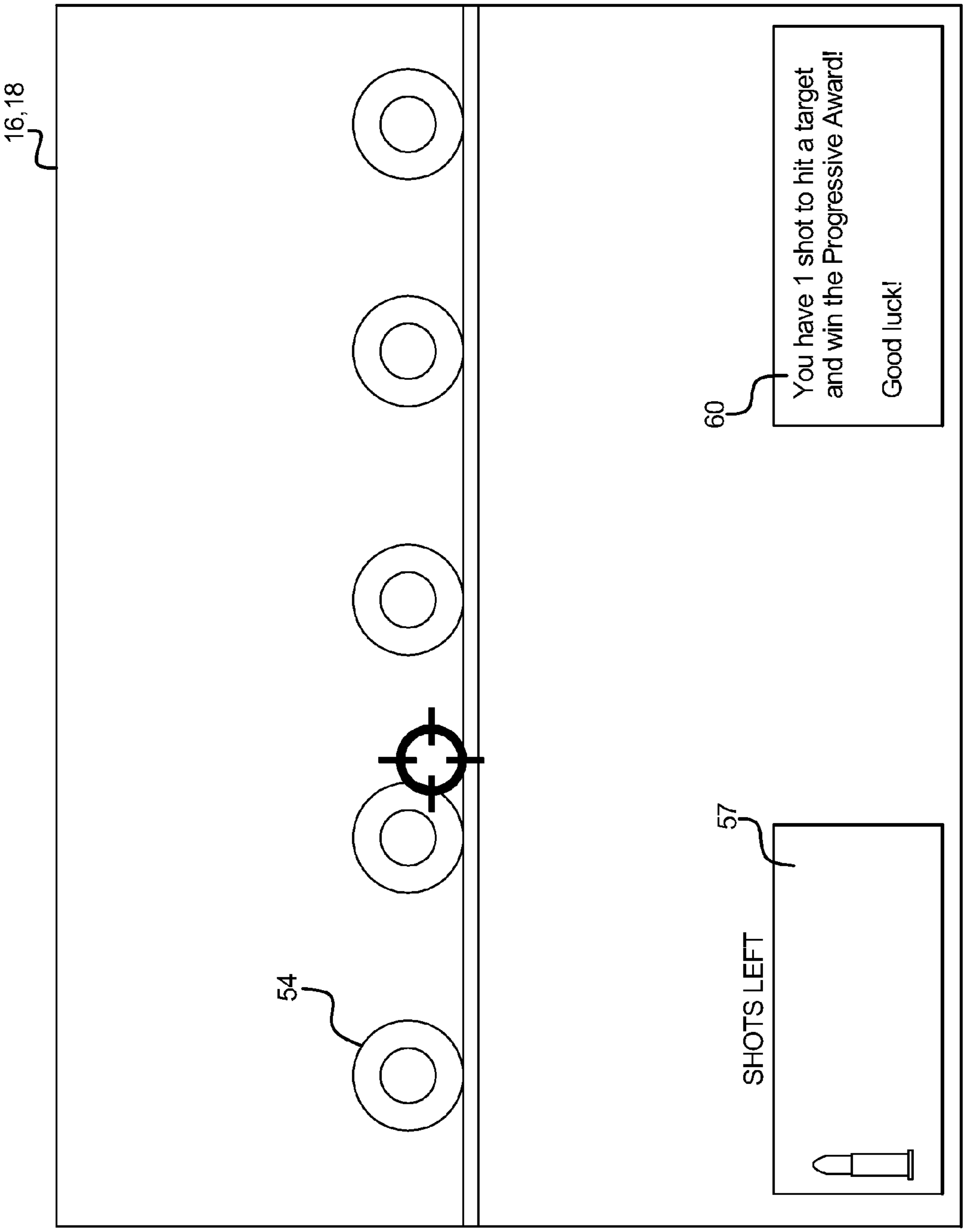
FIGS. 7A and 7B are each front perspective views of one embodiment of the gaming system disclosed herein illustrating a secondary game wherein a player attempts to successfully hit a moving target to win a progressive award.

For example, as seen in FIG. 7A, a secondary game is illustrated wherein the player utilizes the provided opportunities to try to win the progressive award in a pseudo-skill based game by attempting to shoot one of a plurality of moving targets 54 with one or more bullets 57. In this illustrated example, upon an initializing event, such as the player depressing a "shoot" button, the gaming system randomly determines whether to provide the player the progressive award and displays the result of this random determination to the player as either the bullet successfully striking a displayed target or as the bullet unsuccessfully striking a displayed target (e.g., a bullet successfully striking a displayed target represents a random determination of the player winning the progressive award). In this illustrated example, the player's 20,000 opportunities are presented in the form of a single bullet (or shot) which is displayed to the player in opportunity indicator 60. The gaming system displays appropriate messages such as "YOU HAVE 1 SHOT TO HIT A TARGET AND WIN THE PROGRESSIVE AWARD" and "GOOD LUCK!" to the player visually, or through suitable audio or audiovisual displays. In this example, the single bullet represents 20,000 opportunities and is associated with a single random determination having a 1/50.502 probability of successfully causing the player to be provided the progressive award. That is, rather than perform 20,000 separate random determinations, each having a 1/1,000,000 probability of successfully causing the player to win the progressive award, in this illustrated example, the gaming system performs a single random determination (for the single bullet) having a 1/50.502 probability of successfully causing the player to win the progressive award. In this example, the 1/50.502 probability of successfully causing the player to win the progressive award is determined based on one random determination having a 1.98% probability of successfully causing the player to win the progressive award (i.e., $1/50.502=[1-(1-0.0198)^{1/1}]$). It should be appreciated that, in an alternative embodiment, rather than perform a single random determination for the bullet, in the above illustrated example, the gaming system performs 20,000 separate random determinations for the bullet. That is, the gaming system displays the 20,000 opportunities to the player as a single bullet, and when the player depresses the "shoot" button, the gaming system performs 20,000 separate random determinations to determine if the player wins the progressive award.

Figure 7B:
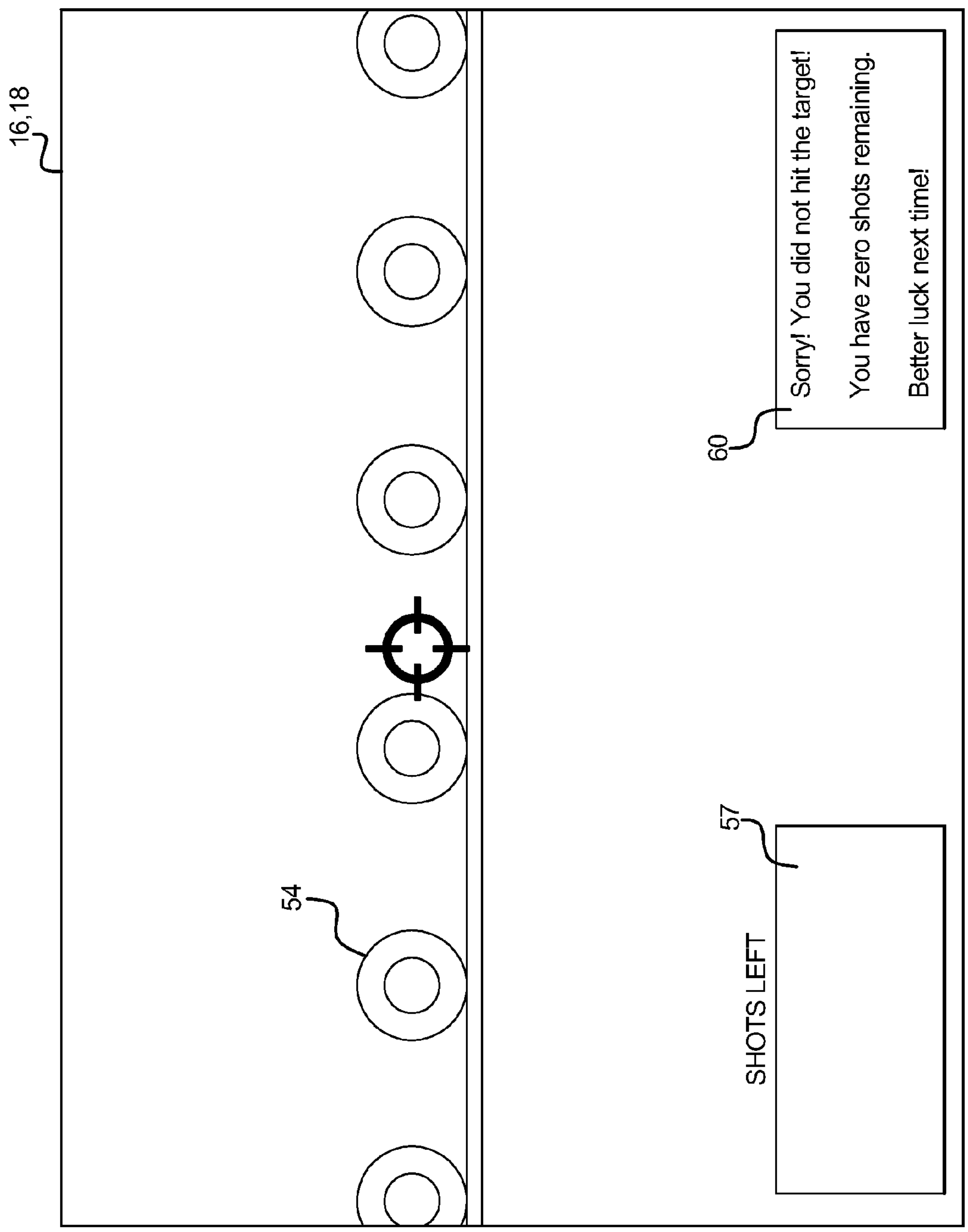

As seen in FIG. 7B, the player does not win the progressive award (e.g., the player's shot does not result in the bullet 57 striking one of the moving targets 54). Accordingly, the gaming system displays appropriate messages such as "SORRY! YOU DID NOT HIT THE TARGET!" and "YOU HAVE ZERO SHOTS REMAINING." and "BETTER LUCK NEXT TIME!" to the player visually, or through suitable audio or audiovisual displays. Accordingly, because the player has zero opportunities (e.g., shots) remaining, the secondary game ends, the gaming system resets the player's score and provides the player any awards associated with any winning outcomes which occurred in associated with the play of the primary game.

Referring back now to FIG. 5, at the point in time indicated by numeral 208 and row 306, prior to the play of the game, the high score has decayed to 82,000,000 (from 92,000,000) and the value of the progressive award has incremented to $11,000.00. After the play of the game, the gaming system forms a score of 90,000,000 for a player playing the game (which is greater than the current high score of 82,000,000). Thus, because the player's score exceeds the current high score, the gaming system modifies the current high score to 90,000,000 and determines to provide the player 80,000 opportunities to win the progressive award. In this example, each opportunity is associated with a 1/1,000,000 probability of causing the player to win the progressive award. Thus, the player has a 7.69% probability of winning the progressive award (i.e., $1-(1-{}^{1}/1{,}000{,}000)^{80{,}000}=7.69\%$).

Figure 8A:
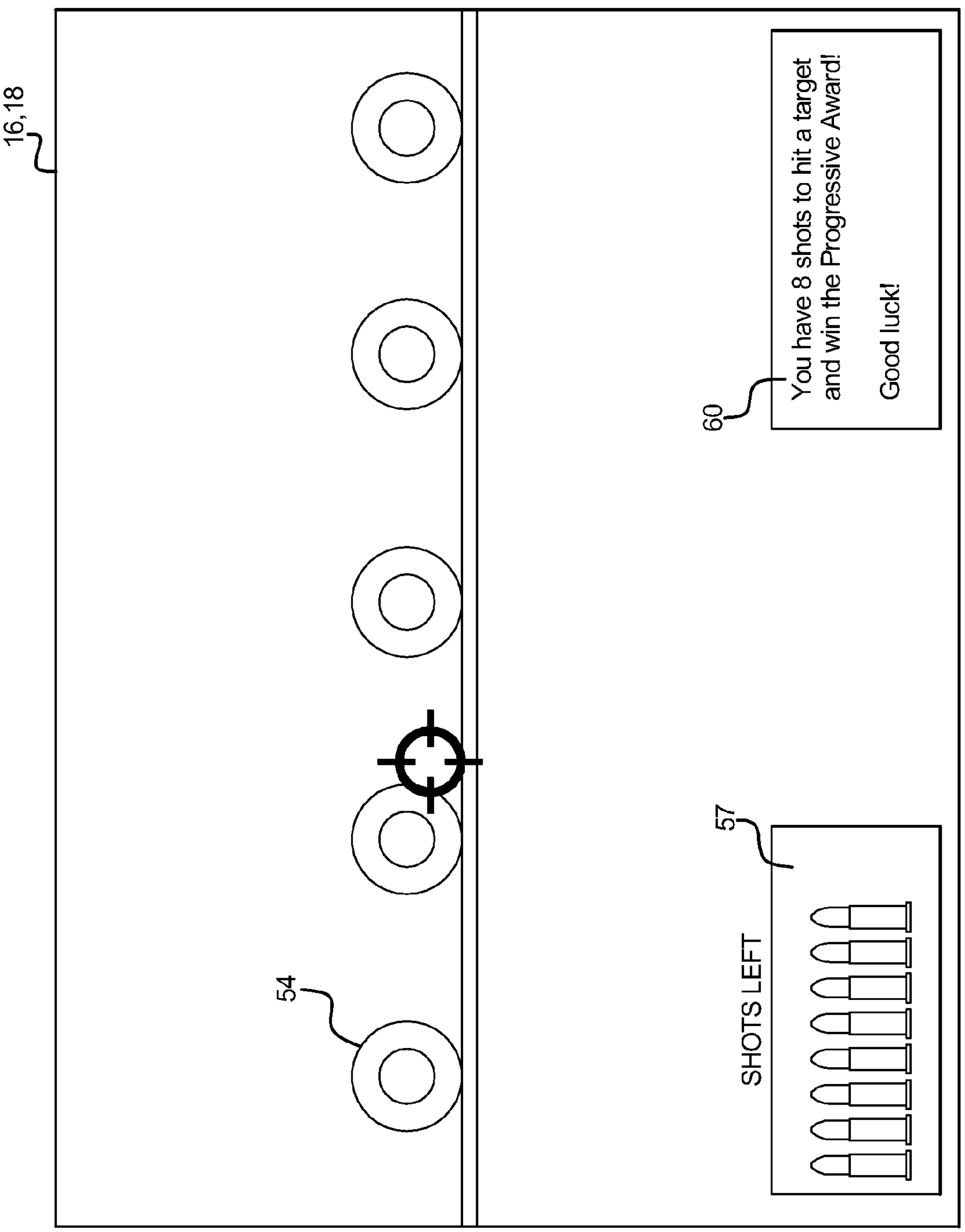
FIGS. 8A, 8B, and 8C are each front perspective views of one embodiment of the gaming system disclosed herein illustrating a secondary game wherein a player attempts to successfully hit a moving target to win a progressive award.

As seen in FIG. 8A, and as discussed above, the player utilizes the provided opportunities to try to win the progressive award by attempting to shoot one of a plurality of moving targets 54 with one or more bullets 57 in a secondary game. In this illustrated example, the player's 80,000 opportunities are presented in the form of eight bullets (or shots) which are displayed to the player in opportunity indicator 60. The gaming system displays appropriate messages such as "YOU HAVE 8 SHOTS TO HIT A TARGET AND WIN THE PROGRESSIVE AWARD" and "GOOD LUCK!" to the player visually, or through suitable audio or audiovisual displays. In this example, each bullet represents 10,000 opportunities and is associated with a single random determination having a 1/100.479 probability of successfully causing the player to be provided the progressive award. In this example, the 1/100.479 probability of successfully causing the player to win the progressive award is determined based on eight random determinations and a 7.69% probability of successfully causing the player to win the progressive award (i.e., $1/100.479=[1-(1-0.0769)^{1/8}]$). It should be appreciated that, in an alternative embodiment, rather than perform a single random determination for each bullet, in the above illustrated example, the gaming system performs 10,000 separate random determinations for each bullet. That is, the gaming system displays the 80,000 opportunities to the player as eight bullets, however, each time the player depresses the shoot button, the gaming system performs 10,000 separate random determinations to determine if the player wins the progressive award.

Figure 8B:
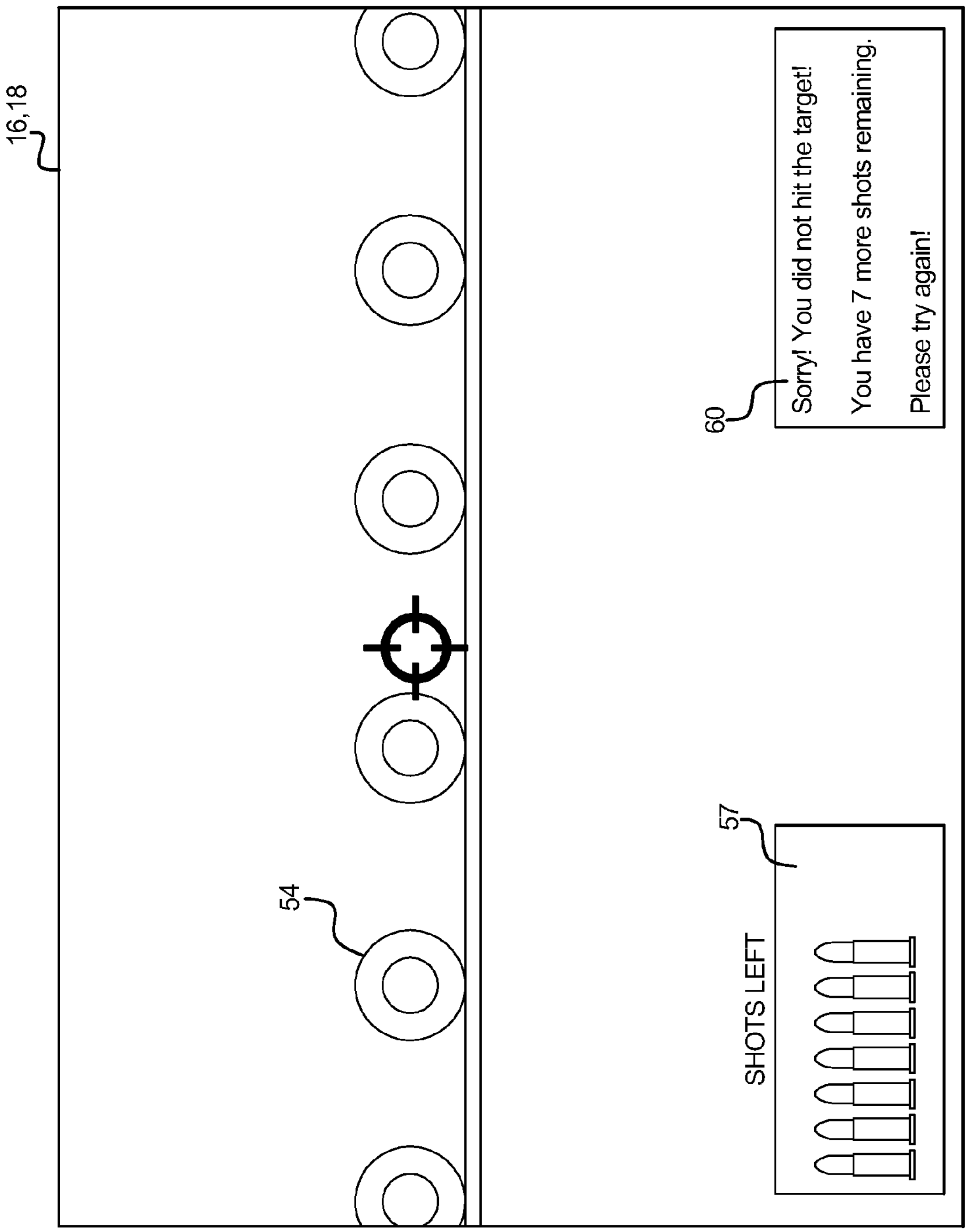
Figure 8C:
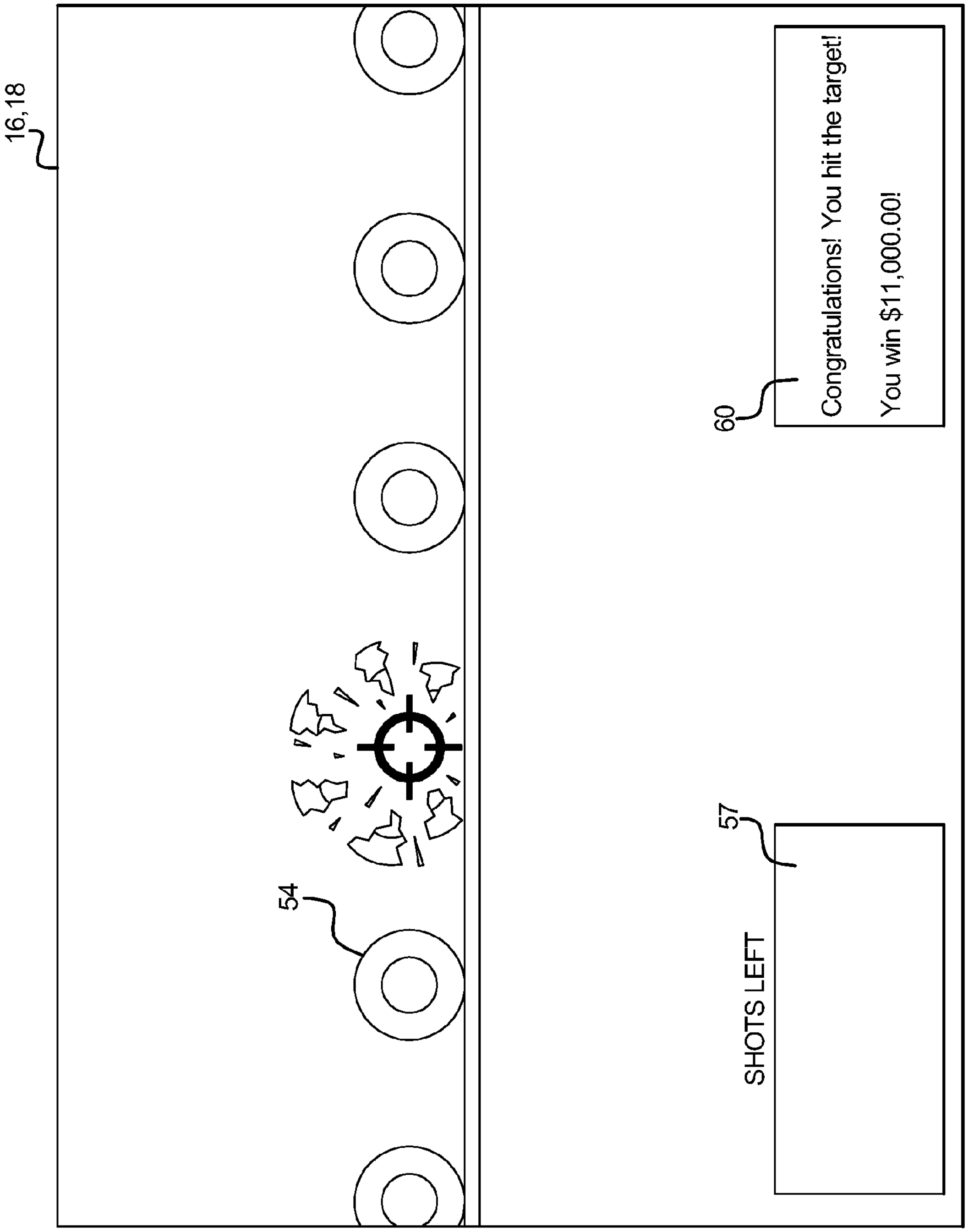

As seen in FIG. 8B, the first random determination does not result in the player winning the progressive award (e.g., the player's first shot does not result in the first bullet striking one of the moving targets 54). Accordingly, the gaming system displays appropriate messages such as "SORRY! YOU DID NOT HIT THE TARGET" and "YOU HAVE 7 MORE SHOTS REMAINING!" and "PLEASE TRY AGAIN!" to the player visually, or through suitable audio or audiovisual displays. As seen in FIG. 8C, the second random determination results in the player winning the progressive award (e.g., the player's second shot successfully strikes one of the moving targets 54), and thus the gaming system provides the player the progressive award of $11,000.00. Accordingly, the gaming system displays appropriate messages such as "CONGRATULATIONS! YOU HIT THE TARGET!" and "YOU WIN $11,000.00!" to the player visually, or through suitable audio or audiovisual displays. After providing the progressive award to the player, the gaming system resets the value of the progressive award to a reset value of $10,000.00, resets the player's score, and provides the player any awards associated with any winning outcomes with occurred in association with the play of the primary game. It should be appreciated that, in this example, although the player has six additional shots remaining in the secondary game, the gaming system forfeits each of these remaining shots (i.e., opportunities) and the secondary game ends because the player wins the progressive award.

While the examples including secondary games discussed above utilize a pseudo-skill based game when determining whether to provide the player a progressive award, in various alternative embodiments, the gaming system provides the player a quantity of opportunities to win a progressive award, wherein the player participates in a skill-based secondary game. In such embodiments, the player's skill actually determines, at least in part, whether the player wins the progressive award. In one such embodiment, if the player properly times an event in the secondary game (e.g., successfully shooting one or more moving targets), the player wins the progressive award. In another embodiment, the gaming system utilizes a secondary game which includes aspects of both skill and pseudo-skill when determining whether to provide the progressive award to the player. For example, a player utilizes skill to properly time an event in the secondary game (e.g., shooting a moving target) and if the player successfully times the event, the gaming system randomly determines if the player wins the progressive award, wherein the random determination is in association with a probability of successfully causing the player to win the progressive award. It should be appreciated that any suitable game involving pseudo-skill, skill, or any combination may be implemented in accordance with the embodiments discussed above in determining whether the player wins the progressive award.

In one embodiment, the amount the high score decays over a designated period of time increases as the quantity of players playing a game associated with that decaying high score increases. That is, if the gaming system causes the high score to decay based, at least in part, on the quantity of games played, as more players play the game at more gaming devices, the quantity of games played over the designated period of time increases, and thus the high score decays by a larger amount over the designated period of time.

In one embodiment, the gaming system tracks a current high score associated with a progressive award and displays a high score, wherein the displayed high score is determined based on the tracked high score. In one embodiment, as discussed above, the gaming system causes the tracked high score (and thus the displayed high score) to decay an amount for each play of the game that a player's formed score does not reach or otherwise exceed the displayed high score. In one embodiment, during periods of increased play (i.e., the quantity of players playing increases) the rate at which the tracked high score decays increases. In this embodiment, the gaming system causes the displayed high score to decay at a constant rate, regardless of the rate at which the tracked high score decays. That is, during periods of increased play, the gaming system causes the displayed high score to decay at a rate that is different than the rate at which the tracked high score decays.

Figure 9:
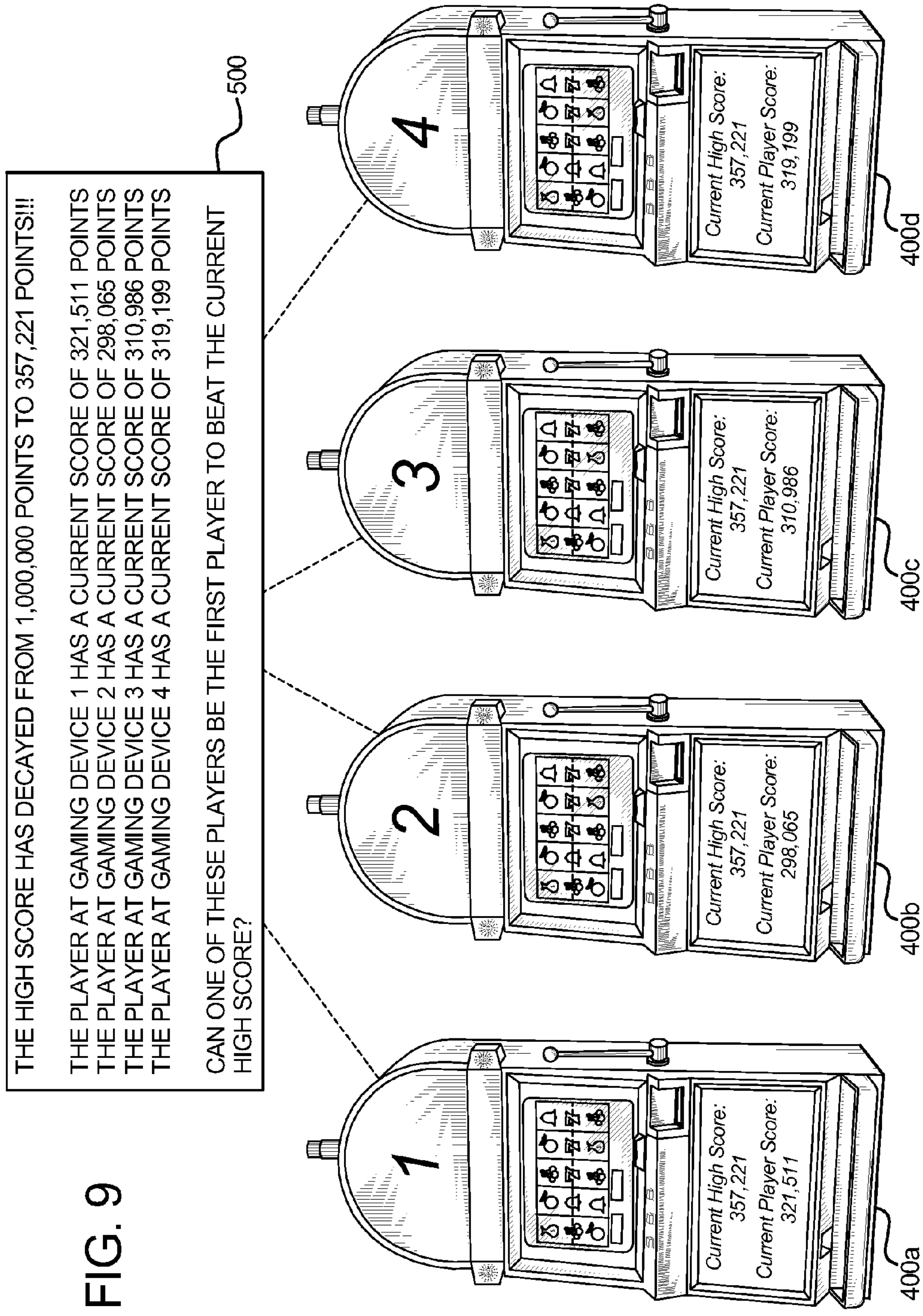
FIG. 9 is a diagrammatic view of one embodiment of the gaming system disclosed herein illustrating a plurality of gaming devices which are each associated with a community display.

In one embodiment, the gaming system displays messages relating to the status of the current decayed high score on a community display. In one such embodiment, the gaming system also displays the status of each player's current score on the community display. For example, as seen in FIG. 9, the gaming system displays messages such as "THE HIGH SCORE HAS DECAYED FROM 1,000,000 POINTS TO 357,221 POINTS!!!" to a plurality of players playing on gaming devices 400*a* to 400*d* on community display 500. In this example, the gaming system also displays messages such as "THE PLAYER AT GAMING DEVICE 1 HAS A CURRENT SCORE OF 321,511 POINTS" and "CAN ONE OF THESE PLAYERS BE THE FIRST PLAYER TO BEAT THE CURRENT HIGH SCORE?" on community display 500. It should be appreciated that, in this example, by displaying such information, certain players experience a feeling of competitiveness and continue attempting to achieve a score which exceeds the current high score before the other players playing the gaming devices in the gaming system.

In one embodiment, when a current high score is relatively high, higher skilled players have higher probabilities of being provided an opportunity to win the progressive award relative to lower skilled players. That is, players that, on average, achieve higher scores, have a higher probability of accumulating enough points to form a score which exceeds the relatively high score, relative to players that, on average, achieve lower scores. For example, if a first player with a first average score achieves a score which exceeds a current high score twenty times in forty games, and a second player with a second, lower average score achieves a score which exceeds a current high score two times in forty games, the first player has a higher probability of being provided one or more opportunities to win the progressive award relative to the second player. However, as the high score continues to decay, lower skilled players have an increased probability of being provided an opportunity to win the progressive award relative to higher skilled players. That is, if the high score decays to a certain point, lower skilled players and higher skilled players have the same, or substantially the same probability of being provided an opportunity to win the progressive award. For example, if the high score decays to a point, wherein a first and a second player have each achieved a score which exceeds the high score, twenty-five out of the last forty games played, the first and the second player each have the same, or substantially the same probability of accumulating enough points to form a score which exceeds the high score.

In one embodiment, the gaming system determines and associates different quantities of potential skill-based point accumulation events with different plays of the primary game. For example, in a first play of the primary game, the gaming system determines and associates a first quantity of potential skill-based point accumulation events with the primary game (e.g., the gaming system presents the player with 30 enemy ships to destroy) and in a second, different play of the primary game, the gaming system determines and associates a second, different quantity of potential skill-based point accumulation events with the primary game (e.g., the gaming system presents the player with 75 enemy ships to destroy). It should be appreciated that, if a high score is extremely large and the gaming system does not determine and associate a large quantity of skill-based point accumulation events with the play of the primary game, even a higher skilled player may not be able to score enough points to beat the current high score. In different embodiments, the quantity of potential skill-based point accumulation events the gaming system associates with the game is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In various embodiments, the gaming system maintains a plurality of decaying high scores, wherein each decaying high score is associated with a progressive award. In one such embodiment, progressive awards which have larger values are associated with high scores which decay at faster rates. For example, a progressive award having a value of $50,000.00 is associated with a high score that is configured to decay at a rate of 10 points per game and a progressive award having a value of $10,000.00 is associated with a high score that is configured to decay at a rate of 100 points per game.

In one alternative embodiment, in addition to determining outcomes in a primary game based on one or more aspects of the player's skill, outcomes in the primary game are also based, at least in part, on one or more random determinations. In one such embodiment, for each play of the game, the quantity of points associated with each skill-based point accumulation event which occurs during the play of the game is randomly determined from within a predetermined range of point values. For example, in a game which involves players attempting to destroy targets to accumulate points, the player is awarded 50 points for destroying a target in a first game, and the player is awarded 85 points for destroying the same target in a second, different game. Thus, in this example, if each game only includes these targets, a player playing the first game that successfully destroys every possible target does not score as many points as a player playing the second game that successfully destroys every possible target. It should be appreciated that, if a high score is extremely large and the gaming system does not associate a large quantity of points with each skill-based point accumulation event which occurs in association with the play of the primary game, even a higher skilled player may not be able to score enough points to beat the current high score. In different embodiments, the quantity of points the gaming system determines to associated with each skill-based point accumulation event is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, in addition to determining the quantity of opportunities to win the progressive award based on the amount by which the player's score exceeds the current high score, the gaming system additionally determines the quantity of opportunities to win the progressive award based on the player's wager. In one such embodiment, the gaming system provides more opportunities for lager wagers. For example, the gaming system provides five times as many opportunities to win a progressive award to a player who places a $5.00 wager relative to a player who places a $1.00 wager.

In another alternative embodiment, each opportunity to win the progressive award is associated with a designated quantity of points. In one embodiment, players accumulate opportunities to win the progressive award based on their accumulated quantity of points, regardless of whether the player's score exceeds the current high score. Thus, in one embodiment, the gaming system provides one or more opportunities to win the progressive award to players that have low quantities of points (or zero points). It should be appreciated that by providing opportunities to win the progressive award based on a designated quantity of points, the gaming system provides lower skilled players with a chance to win the progressive award.

In one embodiment, if each opportunity to win the progressive award is associated with a designated quantity of points and a player's score reaches or exceeds the current high score, the gaming system provides the player an additional quantity of opportunities to win the progressive award in addition to the quantity of opportunities that are provided to the player based on the player's accumulated quantity of points.

In one alternative embodiment, if a player's score is greater than the current high score, the gaming system allocates the first N numbers in a range of numbers to the player based on the margin by which the player's score exceeded the current high score. In this embodiment, the gaming system selects a random number from the range of numbers, and compares the randomly selected number with the numbers allocated to the player. If a match occurs, the gaming system provides the progressive award to the player. For example, if a score formed for a player exceeds a current high score by a margin of 5000 points, the gaming system assigns numbers 1 to 5000 in a range of numbers from 1 to 100,000. In this example the gaming system then randomly selects a number from 1 to 100,000 and if the selected number is any number from 1 to 5000, the player wins the progressive award. It should be appreciated that the player has a 5% chance of winning the progressive award in this example (i.e., 5000/100,000=0.05=5%)

In one alternative embodiment, the gaming system provides the player each opportunity to win the progressive award as that opportunity to win the progressive award arises during the play of the primary game. That is, in this embodiment, the gaming system does not limit providing opportunities to win the progressive award to the end of the primary game. Rather, players are provided opportunities to win the progressive award during the play of the primary game. In one such embodiment, the gaming system accumulates the opportunities to win the progressive award during the play of the primary game, and when the accumulated opportunities reach a designated quantity, the gaming system suspends, discontinues, or otherwise interrupts the play of the primary game and presents a secondary game to the player, wherein the player attempts to utilize the accumulated quantity of opportunities to win the progressive award. In one embodiment, if the player does not win the progressive award during the play of the secondary game, the secondary game ends and the gaming system resumes play of the primary game. In this embodiment, if the player wins the progressive award during the play of the secondary game, the gaming system provides the progressive award to the player and both the secondary and the primary game end.

In another alternative embodiment, the gaming system provides one or more opportunities to win the progressive award to every player that wagers on a play of the primary game. That is, in this embodiment, players do not have to beat the current high score to have an opportunity to win the progressive award. In one such embodiment, the probability associated with each opportunity that is provided to a player that does not achieve a score that is greater than the current high score is the same as the probability associated with each opportunity that is provided to a player who achieves a score that is greater than a current high score. In another such embodiment, the probability associated with each opportunity that is provided to a player that does not achieve a score that is greater than the current high score is different than the probability associated with each opportunity that is provided to a player who achieves a score that is greater than a current high score. In different embodiments, the probability that is associated with each opportunity to win the progressive award is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. It should be appreciated that by providing one or more opportunities to win the progressive award to every player that wagers on a play of the primary game, the gaming system provides each player a chance at of winning the progressive award regardless of the outcome of that game.

In another alternative embodiment, the gaming system determines the quantity of opportunities to win the progressive independent from the rate by which the gaming system causes the high score to decay. In one such embodiment, the gaming system determines the quantity of opportunities to win the progressive award based on the margin by which a score formed for the player exceeds the current high score and a determined factor. For example, the gaming system determines a quantity of opportunities to provide to the player based, at least in part on a determined factor of 20, wherein the quantity of opportunities provided is determined based on the equation: (margin by which player score exceed high score)/20=(number of provided opportunities). In different embodiments, this factor is predetermined, randomly determined, determined based on the player's status (such as determined through a player tracking system), determined based on a random determination by the central controller, determined based on a random determination at the gaming device, determined based on one or more side wagers placed, determined based on the player's primary game wager, determined based on time (such as the time of day), determined based on the quantity of players playing gaming devices in the gaming system, determined based on a player's skill as quantifiable by zero, one or more inputs made by the player in association with the skill-based game, determined based on an amount of coin-in accumulated in one or more pools or determined based on any other suitable method or criteria.

In one alternative embodiment, the gaming system provides players with a same probability of winning the progressive award, regardless of the quantity of provided opportunities. In this embodiment, the gaming system determines a total probability of a progressive award being provided. The gaming system then determines a probability to associate with each provided opportunity (and thus each random determination of whether to provide the progressive award), based on this total probability of the progressive award being provided. In other words, the probability associated with each provided opportunity of a large quantity of provided opportunities is less than the probability associated with each provided opportunity of a small quantity of provided opportunities. Thus, a player that is provided a relatively large quantity of opportunities to win the progressive award (i.e., a higher skilled player) has the same probability of winning the progressive award as a player that is provided a relatively small quantity of opportunities to win the progressive award (i.e., a lower skilled player). For example, the probability of any player winning a progressive award is 1.0%, regardless of a quantity of opportunities provided to a player. In this example, a high skilled player is provided 25,000 opportunities to win the progressive award. Accordingly, because the probability of any player is 1.0%, the gaming system determines that each of the 25,000 opportunities provided to the high skilled player have a 1/2,487,479.6 probability of causing the high skilled player to win the progressive award (i.e., $1/2{,}487{,}479.6=[1-(1-0.01)^{1/25{,}000}]$). Similarly, in this example, a low skilled player is provided 2,000 opportunities to win the progressive award. Accordingly, because the probability of any player is 1.0%, the gaming system determines that each of the 2,000 opportunities provided to the low skilled player have a 1/198,998.8 probability of causing the low skilled player to win the progressive award (i.e., $1/198{,}998.8=[1-(1-0.01)^{1/2{,}000}]$).

In one alternative embodiment, the gaming system determines a maximum quantity of opportunities to win a progressive award (and thus a maximum probability of winning the progressive award) to provide to a player. In this embodiment, the quantity of opportunities to win the progressive award that are provided to a player does not exceed this determined maximum quantity. In various embodiments, the determined maximum quantity of opportunities to win a progressive award that are provided to a player is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In an alternative embodiment, rather than cause the high score to decay, if the player's score does not exceed the current high score, the gaming system increases the quantity of points associated with the one or more skill-based point accumulation events which occur in association with the play of the game. That is, in this embodiment, the gaming system provides different quantities of points for a skill-based point accumulation event at different points in time. For example, at a first point in time, a first skill-based point accumulation event is associated with a first quantity of points, and at a second, different point in time, the first skill-based point accumulation event is associated with a second, different quantity of points.

While players in the examples discussed above are automatically provided a quantity of opportunities to win the progressive award for achieving a score that is greater than the current high score, in an alternative embodiment, if the player's score exceeds the current high score, that player's score must remain the high score for a designated period of time before the gaming system provides the player a quantity of opportunities to win the progressive award. That is, in this alternative embodiment, although the player beats the current high score, the gaming system provides other players with a designated period of time within which to beat the high score before providing any opportunities to win the progressive award to the player that beat the high score.

In one alternative embodiment, the gaming system does not cause a high score to decay until the progressive award with which that high score is associated is sufficiently funded. For example, the gaming system does not cause a high score of 5,000,000 to decay from 5,000,000 until the progressive award with which it is associated has been sufficiently funded.

In another alternative embodiment, if a player's score is greater than a current high score and the player wins the progressive award, the gaming system modifies the high score to reflect a score that is different than the player's score. In one embodiment, the gaming system determines this different score based on a portion of the subsequent progressive award which has not yet been sufficiently funded, the rate at which the gaming system causes the progressive award to decay, the amount of each wager that is contributed to funding the progressive award, and the average score per game during a designated period of time. For example, if a player win a progressive award and only $4,265.50 of a subsequent $5,000.00 progressive award has been funded (i.e., $734.50 of the subsequent progressive award has not yet been funded) the gaming system determines a high score to associate with the subsequent $5000.00 progressive award. In this example, because $734.50 of the subsequent progressive award has not been funded, the gaming system determines a high score of 860,815, which is based on the average score over a designated period of time and an additional amount of 734,500. In this example, the additional amount of 734,500 is determined based on the $734.50 of the subsequent progressive award which has not yet been funded, a decay rate of 10 points per game, and $0.01 per dollar wagered being contributed to funding the progressive award. In different embodiments, the additional amount is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In another alternative embodiment, if a player's score is greater than a current high score and the player wins the progressive award, the gaming system modifies the high score to reflect a score that is different than the player's score. In this embodiment, the gaming system designates a maximum high score, wherein if a score formed for a player reaches or exceeds a current high score and the maximum high score, the gaming system modified the high score to reflect the maximum high score. For example, if a current high score is 40,000,000 points and a maximum high score is 50,000,000 points, and a score formed for a player is 75,000,000 points, the gaming system modifies the high score of 40,000,000 points to reflect the maximum high score of 50,000,000 points. It should be appreciated that by determining a maximum high score, the gaming system provides that lower skilled players have a better chance of winning a progressive award. That is, scores formed for lower skilled players are lower on average and by determining a maximum high score, regardless of an amount by which a formed score for a player (e.g., a highly skilled player) exceeds the current high score, the gaming system provides a maximum margin by which the high score exceeds average scores formed for lower skilled players.

In one embodiment, the gaming system determines the quantity of opportunities to win the progressive award to provide to the player based on this maximum high score. For example, the gaming system determines a quantity of opportunities to win the progressive award to provide to the player based on the score formed for the player exceeding the maximum high score by a margin of 25,000,000 (i.e., 75,000,000−50,000,000=25,000,000). That is, regardless of what the current high score is, if the score formed for the player exceeds the current high score by a margin that exceeds the margin between the current high score and the maximum high score (e.g., 50,000,000−40,000,000=10,000,000), the gaming system determines the quantity of opportunities based on the margin by which the score formed for the player exceeds the maximum high score (e.g., 25,000,000 in this case because 25,000,000 is a greater margin than 10,000,000).

In another alternative embodiment, the gaming system designated a maximum amount by which a current high score increases if it is exceeded by a score formed for a player, wherein if the score formed by the player exceeds this maximum amount, the gaming system modifies the high score to reflect a score that is based on the current high score and the maximum amount by which the current high score increases. For example, if the high score is 40,000,000 and the maximum amount by which it increases is 10,000,000 and a score formed for a player is 75,000,000, the gaming system modifies the high score to reflect a high score of 50,000,000 (i.e., 40,000,000+10,000,000=50,000,000). It should be appreciated that by determining a maximum amount by which a current high score increases if it is exceeded by a score formed for a player, the gaming system provides that lower skilled players have a better chance of winning a progressive award. That is, scores formed for lower skilled players are lower on average and by maximizing an amount by which a high score increases, regardless of an amount by which a formed score for a player (e.g., a highly skilled player) exceeds the current high score, the gaming system provides a maximum margin by which the high score exceeds average scores formed for lower skilled players.

In one embodiment, for each of a plurality of players playing the gaming devices in the gaming system, the player's personal high score is tracked in association with that player's tracking card. In one such embodiment, if the gaming system forms a score for the player which exceeds that player's personal high score, as discussed above, the gaming system provides that player one or more opportunities to win a progressive award. In one embodiment, if the player wins the progressive award, the gaming system resets the personal high score for each of the plurality of players at the gaming devices in the gaming system.

In one embodiment, for each of a plurality of players at the gaming devices in the gaming system, the gaming system forms a progressive award by allocating a percentage of the player's wager into the player's own progressive award or pool (i.e., a personal progressive award) and subsequently returning the player's progressive award or pool to the player upon the occurrence of an event. In this embodiment, the personal progressive increments based on the player's play and is stored in association with that player's tracking card. Thus, if the player moves to another gaming device, their personal progressive incremental value moves with them. In one embodiment, if the gaming system forms a score for the player which exceeds that player's personal high score, the gaming system provides that player one or more opportunities to win their personal progressive award. In this embodiment, as discussed above, the quantity of provided opportunities to win the personal progressive award is based on the margin by which the score formed for the player exceeded the player's personal high score.

It should be appreciated that, while the embodiments discussed above include the gaming system causing the high score to decay if the score formed for the player does not reach or exceed the current high score, in different embodiments, the gaming system causes the high score to decay based on different criteria. In one embodiment, the gaming system causes the high score to decay based on a designated amount of time since a score formed for a player reaches or exceeds the high score. In another embodiment, the gaming system causes the high score to decay based on one or more wagers placed on gaming machines in the gaming system. In another embodiment, the gaming system causes the high score to decay based on one or more random determinations which occur in association with a play of a game on a gaming machine in the gaming system (such as a designated symbol combination). It should be appreciated that the gaming system may cause the high score to decay based on any other suitable criteria.

While the gaming system in the embodiments disclosed above provides players one or more opportunities to win the progressive award if the score formed for the player exceeds a current high score, it should be appreciated that, in an alternative embodiment, the gaming system provides players one or more opportunities to win the progressive award if the score formed for the player is less than a current low score. In this alternative embodiment, the gaming system reduces a quantity of zero, one or more points from a player for each point reduction event which occurs in association with the play of the game. Continuing with this embodiment, if a score formed for a player is not less than a current low score, the gaming system causes the low score to increase based on a designated criteria. If the score formed for the player is less than the current low score, as discussed above, the gaming system provides the player one or more opportunities to win the progressive award. Accordingly, it should be appreciated that providing a player one or more opportunities to win a progressive award if the score formed for the player is less than the current low score can be implemented in accordance with the embodiments disclosed herein.

In one alternative embodiment, the gaming system determines to provide a player one or more opportunities to win a progressive award based on one or more designated events occurring in association with the play of the game. In this alternative embodiment, the gaming system determines the quantity of provided opportunities (and thus the probability) to win the progressive award based, at least in part, on the amount the progressive award has incremented. That is, if the progressive award has incremented a first amount, the gaming system provides the player a first quantity of opportunities to win the progressive award, and if the progressive award has incremented as second, different amount, the gaming system provides the player a second, different quantity of opportunities to win the progressive award.

In one alternative embodiment, the gaming system maintains a plurality of progressive awards, wherein each progressive award is associated with a separate high score. In one embodiment, the gaming system causes each high score associated with a progressive award to decay based on designated criteria, as discussed above. In one embodiment, each high score associated with a progressive award decays based on a same designated criteria. In another embodiment, at least two high scores associated with a progressive award decay based on at least one different designated criteria. That is, in this embodiment, at least one high score associated with a progressive award decays independent of at least one other high score associated with another progressive award. It should be appreciated that, in different embodiments, the gaming system causes different progressive awards to decay at different rates.

In one embodiment, each of the maintained progressive awards is associated with a separate reset value. In another embodiment, each of the maintained progressive awards are associated with a same reset value.

In one embodiment, the gaming system causes each progressive award to increment at a same rate. In another embodiment, the gaming system causes each progressive award to increment at a different rate.

In one alternative embodiment, the gaming system enables a player to initiate the play of the skill-based game by purchasing a contract to play the skill-based game for a designated amount of time (in exchange for a designated amount of money). In one embodiment, the skill-based game includes a plurality of game elements and the gaming system enables the player to interact with the plurality of game elements, such as by making zero, one or more quantifiable inputs, in the skill-based game. In one such embodiment, each interaction with one of the plurality of the game elements constitutes a wagering event. That is, based on the player's interactions with the plurality of game elements in the skill-based game, the gaming system enables the player to cause at least one wagering event to occur in association with the game.

In one embodiment, for the occurrence of the wagering event, the gaming system determines a wager (e.g., an amount of a wager) based on an amount of time elapsed since a previous wagering event. That is, the gaming system tracks the occurrence of each wagering event and determines the amount of time that elapses between consecutive wagering events. Based on the amount of time that elapses between consecutive wagering events, the gaming system determines the wager.

After the occurrence of the wagering event, the gaming system determines whether to provide the player an award (e.g., a skill-based game award), a quantity of points, or both for the wagering event. In one embodiment, this determination is based, at least in part, on zero, one or more quantifiable inputs made by the player which tend to measure that player's level of skill in the skill-based game. In one embodiment, the wagering event includes at least one of: (i) an award generating event, and (ii) a point accumulation event. In one embodiment, the gaming system accumulates different quantities of points for the player based on different skill-based events (e.g., award generating events, point accumulation events or both) which occur during the play of the skill-based game (e.g., interactions with game elements of the skill-based game resulting from zero, one or more quantifiable inputs made by the player in the skill-based game). It should be appreciated that for purposes of this application, the skill-based events or interactions involve one or more aspects of physical skill, mental, or any other type of skill, as discussed above. That is, the gaming system measures a level of skill of the player in interacting with the game elements (as based on zero, one or more quantifiable inputs made by the player) in the skill-based game and determines an award, an amount of points or both to provide the player for each different interaction with the game elements resulting from the player's inputs in the skill-based game.

In one embodiment, the gaming system determines whether the wagering event includes one of a plurality of award generating events. The gaming system then determines whether to provide the player with an award. In one embodiment, the gaming system determines whether to provide the player an award independent of that player's skill. In another embodiment, the gaming system determines whether to provide the player an award based on that player's skill (as based on zero, one or more quantifiable inputs made by the player) in the skill-based game. If the gaming system determines to provide the player with an award based on that player's measured skill in the skill-based game, the gaming system provides the determined award to the player. In one embodiment, the determined award is based on the determined wager. In another embodiment, the determined award is based on zero, one or more quantifiable inputs made by the player which tend to measure the player's level of skill in the skill-based game. In different embodiments, the determined award is based on at least one of: a random determination, a time elapsed since a last successful interaction with any one of the game elements, and a time elapsed before a first successful interaction with any one of the game elements. However, if the gaming system determines not to provide the player with an award, the gaming system does not provide the determined award to the player.

The gaming system also determines whether the wagering event includes one of a plurality of point accumulation events. The gaming system then determines whether to provide the player with a quantity of points based on that player's skill (as based on zero, one or more quantifiable inputs made by the player) in the skill-based game. If the gaming system determines not to provide the player with a quantity of points based on the player's skill in the skill-based game, the gaming system enables the player to continue playing the skill-based game and enables that player to cause another wagering event in association with the skill-based game as described above. However, if the gaming system determines to provide the player with a quantity of points based on the player's skill in the skill-based game, the gaming system determines the quantity of points to provide (and thus accumulate for) the player. In one embodiment, the gaming system determines the quantity of points to provide the player based on the determined wager. In another embodiment, the gaming system determines the quantity of points to provide the player based on the zero, one or more quantifiable inputs made by the player which tend to measure that player's level of skill measured in the skill-based game, a random determination, a time elapsed since a last successful interaction with any one of the game elements, and the wager determined.

As discussed above, after the gaming system determines a quantity of points to provide to the player, the gaming system accumulates the determined quantity of points and forms a score for the player based on the quantity of points accumulated for the player. In one embodiment, the gaming system then determines if the score formed for the player reaches or otherwise exceed a high score associated with a progressive award. In one embodiment, as discussed above, if the score formed for the player does not reach or otherwise exceed the high score associated with the progressive award, the gaming system causes the high score associated with the progressive award to decay based on a designated criteria.

In one alternative embodiment, the gaming system enables the player to fund the skill-based game with a total wager amount. After designated wagering events occur in association with the skill-based game, the gaming system divides this total wager amount into a plurality of wager components (e.g., portions of the total wager amount) which the gaming system automatically wagers for the player.

In one embodiment, the gaming system enables players to play an interactive skill-based game and make wager components during the skill-based game, wherein the wagering outcome for each wager component is independent from the skill-based game. In one embodiment, the player funds the gaming machine. For example, the player funds the gaming machine with an amount of credits and designates the amount or value of the wager components. During play of the interactive game, upon the occurrence of a wager triggering event, the gaming machine causes one of the designated wagering events to occur which includes a placement of one of the wager components. It should be appreciated that, in one embodiment, a plurality of wagering events occur during the play of the interactive skill-based game, and thus a plurality of wager components are placed.

In one embodiment, the gaming system determines whether to provide the player an award, a quantity of points, or both for the occurrence of each wagering event. In one embodiment, this determination is based, at least in part, on zero, one or more quantifiable inputs made by the player in the skill-based game. That is, the determination of whether to provide the player an award, a quantity of points, or both is based on zero, one or more quantifiable inputs made by the player which tend to measure one or more aspects of that player's skill in the skill-based game.

After the occurrence of the wagering event, the gaming system determines whether to provide the player with an award. In one embodiment, the gaming system determines whether to provide the player with an award independent of the player's skill in the skill based game. In another embodiment, the gaming system determines whether to provide the player with an award (e.g., a skill-based game award) based on zero, one or more quantifiable inputs made by the player which tend to measure that player's level of skill in the skill-based game. If the gaming system determines to provide the player with an award based on that player's skill in the skill-based game, the gaming system provides the determined award to the player. In one embodiment, the determined award is based on the automatically wagered wager component. However, if the gaming system determines not to provide the player with an award based on that player's skill in the skill-based game, the gaming system does not provide the determined award to the player.

After the occurrence of the wagering event, the gaming system also determines whether to provide the player with a quantity of points based on zero, one or more quantifiable inputs made by the player which tend to measure that player's level of skill in the skill-based game. If the gaming system determines not to provide the player with a quantity of points based on the player's skill in the skill-based game, the gaming system enables the player to continue playing the skill-based game and further enables that player to cause another wagering event in association with the play of the skill-based game. However, if the gaming system determines to provide the player with a quantity of points based on the player's skill in the skill-based game, the gaming system determines the quantity of points to provide (or otherwise accumulate for) the player. In one embodiment, the gaming system determines the quantity of points to provide the player based on the automatically wagered wager component. In another embodiment, the gaming system determines the quantity of points to provide the player based on the player's level of skill in the skill-based game and the automatically wagered wager component. In one embodiment, the gaming system accumulates different quantities of points for the player based on different skill-based events which occur in response to the player making zero, one or more quantifiable inputs during the play of the skill-based game (e.g., interactions with game elements of the skill-based game). It should be appreciated that for purposes of this application, the skill-based events or interactions involve one or more aspects of physical skill, mental skill (e.g., knowledge and/or strategy), or any other type of skill.

After the gaming system determines a quantity of points to provide to the player, the gaming system accumulates the determined quantity of points and forms a score for the player based on the quantity of points accumulated for the player. In one embodiment, the gaming system then determines if the score formed for the player reaches or otherwise exceed a high score associated with a progressive award. In one embodiment, as discussed above, if the score formed for the player does not reach or otherwise exceed the high score associated with the progressive award, the gaming system causes the high score associated with the progressive award to decay based on a designated criteria.

In one embodiment, a point modification event occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a point modification event occurs based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a point modification event occurs based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific machine (which gaming device is the first to contribute $250,000), a number of gaming devices active, or any other parameter that defines a suitable threshold.

In another alternative embodiment, a point modification event occurs based on time. In this embodiment, a time is set for when one or more of such events or conditions will occur. In one embodiment, such a set time is based on historic data.

In another alternative embodiment, a point modification event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming device. The central server/gaming device processor determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a point modification event occurs based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a point modification event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing one or more points to be provided may be implemented in accordance with the gaming system and method disclosed herein.

Information Provided to Player

As indicated above, suitable information about the point accumulation event and the current high score can be provided to the players through one or more displays on the gaming devices or additional information displays positioned near the gaming devices, such as above a bank of system gaming devices. In one embodiment, a metering and/or information display device may be used to display information regarding the point accumulation events and the current high score. Examples of such information are:

(1) that a point accumulation event has occurred;

(2) that a point accumulation event will shortly occur, (3) that one or more progressive awards have been provided to one or more players of the system of gaming devices;

(4) that a player has beaten the current high score;

(5) that a player is close to beating the current high score, (6) an average amount of time between each point accumulation event occurring;

(7) an average amount of time between players beating the current high score;

(8) an award provided in association with point accumulation event;

(9) an award provided in association with a player beating the current high score;

(10) which players have won awards in association with a point accumulation event;

(11) which players have won awards in association with beating the current high score;

(12) the amount of the awards won in association with a point accumulation event;

(13) the amount of the awards won in association with beating the current high score;

(14) the highest award won in association with a point accumulation event;

(15) the highest award won in association with beating the current high score;

(16) the average award won in association with a point accumulation event;

(17) the average award won in association with beating the current high score;

(18) the number of games played/total time since the last displayed value of a progressive award has been provided;

(19) the number of games played/total time since a player last beat the current high score; and It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one gaming device, said at least one gaming device including at least one input device;

at least one display device associated with said at least one gaming device; and at least one controller configured to operate with said at least one gaming device and said at least one display device to:

(a) maintain a progressive award associated with a first designated score;

(b) cause a wager to be placed;

(c) if a point modification event occurs during a play of a skill-based game, determine a quantity of points to form a score for a player;

(d) if the formed score for the player has not reached said first designated score, modify said first designated score based on a designated criteria; and (e) if the formed score for the player has at least reached said first designated score:

(i) set the formed score for the player as a second designated score;

(ii) determine and provide to the player a quantity of opportunities to win said progressive award, wherein the quantity of provided opportunities is based, at least in part, on a margin by which the formed score for the player is different than said first designated score;

(iii) for each of said quantity of opportunities, randomly determine whether to provide the progressive award to the player;

(iv) if the determination is not to provide the progressive award to the player, reset the formed score for the player; and (v) if the determination is to provide the progressive award to the player:

(A) provide the player the progressive award;

(B) reset the progressive award to a reset value; and (C) reset the formed score for the player.

2. The gaming system of claim 1, wherein a plurality of different point modification events occur in association with the play of the game, and at least two different quantities of points are determined in association with said plurality of point modification events.

3. The gaming system of claim 1, wherein the point modification event occurs based on at least one selected from the group consisting of: at least one quantifiable input of a mental skill, and at least one quantifiable input of a physical skill.

4. The gaming system of claim 1, wherein each of said provided opportunities is associated with a probability of the player winning the progressive award, wherein the probability is determined based, at least in part, on the margin by which the formed score for the player is different than said first designated score.

5. The gaming system of claim 1, wherein the wager that is caused to be placed enables the player to play the skill-based game for a designated period of time, wherein the designated period of time includes a plurality of plays of the game.

6. The gaming system of claim 1, wherein the quantity of provided opportunities to win said progressive award is one.

7. The gaming system of claim 1, wherein if the formed score for the player at least reaches said first designated score, said at least one controller is configured to cause the player to be provided an award in addition to any provided progressive award.

8. The gaming system of claim 1, wherein the designated criteria includes an amount of time elapsed since said first designated score was at least reached.

9. The gaming system of claim 1, wherein the designated criteria includes a quantity of games played since said first designated score was at least reached.

10. The gaming system of claim 1, wherein if the formed score for the player has not reached said first designated score, the controller is configured to provide the player any award for any winning outcomes which occur in association with the play of the skill-based game.

11. The gaming system of claim 1, wherein said at least one controller is configured to cause the player to be provided any awards for any winning outcomes which occurred in association with the play of the skill-based game in addition to any provided progressive award.

12. The gaming system of claim 1, wherein the quantity of opportunities provided is based on the wager placed.

13. The gaming system of claim 1, wherein said at least one controller is configured to modify said first designated score by different designated amounts at different points in time.

14. The gaming system of claim 1, wherein said at least one controller is configured to maintain a plurality of different progressive awards, and wherein each maintained progressive award is associated with a separate high score.

15. The gaming system of claim 1, wherein said point modification event is a point reduction event and said first designated score is a low score and if said formed score for the player does not reach said first designated score, said controller is configured to cause said first designated score to increase based on said designated criteria.

16. A gaming system comprising:

at least one gaming device, said at least one gaming device including at least one input device;

at least one display device associated with said at least one gaming device; and at least one controller configured to operate with said at least one gaming device and said at least one display device to:

(a) maintain a progressive award;

(b) upon each occurrence of a point modification event, modify a first quantity of points for the player;

(c) if said first quantity of points for the player at least reaches a first designated quantity of points, determine whether to provide the progressive award to the player, wherein said determination is associated with a first probability of the gaming system providing the progressive award to the player, said probability is based, at least in part, on a first margin by which said first quantity of points is different than said first designated quantity of points; and (d) if said first quantity of points for the player at least reaches a second, different designated quantity of points, determine whether to provide the progressive award to the player, wherein said determination is associated with a second, different probability of the gaming system providing the progressive award to the player said second, different probability is based, at least in part, on a second margin by which said first quantity of points is different than said second, different designated quantity of points.

17. The gaming system of claim 16, wherein if said first quantity of points for the player does not reach said first designated quantity of points, said at least one controller is configured to modify said first designated quantity of points based on a designated criteria.

18. The gaming system of claim 16, wherein if said first quantity of points for the player does not reach said second designated quantity of points, said at least one controller is configured to modify said second designated quantity of points based on a designated criteria.

19. The gaming system of claim 16, wherein said at least one controller is configured to maintain a plurality of different progressive awards, and wherein each maintained progressive award is associated with a separate high score.

20. The gaming system of claim 16, wherein each point modification event is a point reduction event and said first designated quantity of points is a low quantity of points and if said first quantity of points for the player does not reach said first designated quantity of points said controller is configured to cause said first designated quantity of points to increase based on a designated criteria.

21. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a progressive award;

(b) at a first point in time, determine and associate a first designated score with said progressive award, wherein at said first point in time, a first player playing a skill-based game at a first one of said gaming devices has a greater probability of being provided at least one opportunity to win said progressive award than a second, different player playing the skill-based game at a second, different one of said gaming devices;

(c) modify said first designated score based on a designated criteria; and (d) at a second, subsequent point in time, determine and associate a second, different designated score with said progressive award, wherein at said second point in time, the first player playing the skill-based game at said first one of said gaming devices has substantially a same probability of being provided at least one opportunity to win said progressive award as the second player playing the skill-based game at said second, different one of said gaming devices.

22. The gaming system of claim 21, wherein the designated criteria is an amount of time elapsed since said first designated score was at least reached.

23. The gaming system of claim 21, wherein the designated criteria is an amount of games played since said first designated score was at least reached.

24. The gaming system of claim 21, wherein at said first point in time, the probability of the first player being provided said at least one opportunity to win said progressive award is based on at least one quantifiable input made by the first player playing the skill-based game at said first one of said gaming devices.

25. The gaming system of claim 21, wherein at said first point in time, the probability of the second player being provided said at least one opportunity to win said progressive award is based on at least one quantifiable input made by the second player playing the skill-based game at said second one of said gaming devices.

26. The gaming system of claim 21, wherein said at least one controller is configured to maintain a plurality of different progressive awards, and wherein each maintained progressive award is associated with a separate designated score.

* * * * *

UNITED STATES PATENT AND TRADEMARK OFFICE

CERTIFICATE OF CORRECTION

PATENT NO. : 8,231,453 B2
APPLICATION NO. : 12/547141
DATED : July 31, 2012
INVENTOR(S) : Bryan D. Wolf et al.

It is certified that error appears in the above-identified patent and that said Letters Patent is hereby corrected as shown below:

IN THE CLAIMS

Column 44, in Claim 2, Line 3, between “the” and “game” insert --skill-based--.
Column 44, in Claim 5, Line 20, between “the” and “game” insert --skill-based--.
Column 44, in Claim 10, Line 37, between “the” and “controller” insert --at least one--.
Column 45, in Claim 16, Line 3, replace “the” with --a--.
Column 45, in Claim 16, at about Line 9, between “player,” and “said” insert --and-- and between “said” and “probability” insert --first--.
Column 45, in Claim 16, Line 19, after “player” insert --,--.
Column 45, in Claim 16, Line 20, replace “is” with --being--.

Signed and Sealed this
First Day of January, 2013

David J. Kappos

David J. Kappos
*Director of the United States Patent and Trademark Office*